(12) United States Patent
Kitamura et al.

(10) Patent No.: US 6,820,036 B2
(45) Date of Patent: Nov. 16, 2004

(54) MONITORING SYSTEM

(75) Inventors: Misayo Kitamura, Tokyo (JP); Katsuyuki Inoue, Tokyo (JP); Taizo Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 127 days.

(21) Appl. No.: 10/234,122

(22) Filed: Sep. 5, 2002

(65) Prior Publication Data

US 2003/0046027 A1 Mar. 6, 2003

(30) Foreign Application Priority Data

Sep. 5, 2001 (JP) ........................................ 2001-268684

(51) Int. Cl.$^7$ ........................... G06F 11/30; G06F 15/00
(52) U.S. Cl. ........................................ 702/182; 700/83
(58) Field of Search ............................... 702/81–83, 84, 702/113–115, 122, 177, 179, 182, 183–185, 187, 188; 700/17, 83, 108, 109, 115, 116; 340/679, 680; 345/866

(56) References Cited

U.S. PATENT DOCUMENTS

| | | | |
|---|---|---|---|
| 5,132,920 A | * | 7/1992 | Bellows et al. ............... 702/184 |
| 5,247,433 A | * | 9/1993 | Kitaura et al. ................. 700/83 |
| 5,381,158 A | * | 1/1995 | Takahara et al. ............. 345/156 |
| 5,717,914 A | * | 2/1998 | Husick et al. .................. 707/5 |
| 5,748,495 A | * | 5/1998 | Arita et al. ................... 702/185 |
| 5,764,913 A | | 6/1998 | Jancke et al. |
| 6,031,453 A | * | 2/2000 | Brinzer ......................... 340/525 |

FOREIGN PATENT DOCUMENTS

| | | | |
|---|---|---|---|
| EP | 1098258 A1 | * 5/2001 | ............ G06F/17/30 |
| JP | 5-133775 | 5/1993 | |
| JP | 10-069361 | 3/1998 | |
| JP | 11259780 A | * 9/1999 | ............ G08B/23/00 |

OTHER PUBLICATIONS

Tanaka, T. et al.; "Electronics Information IRE: Communication Society Congress; A Proposal of Pictures Control Considering Object–Relationship for Network Operation", p. 243, (1996).

* cited by examiner

Primary Examiner—Marc S. Hoff
Assistant Examiner—Manuel L Barbee
(74) Attorney, Agent, or Firm—Leydig, Voit & Mayer, Ltd.

(57) ABSTRACT

A monitoring system indicating the condition of a plant at any time and from any place by particularly utilizing a small graphical content such as the display of a handy cellular phone. In particular, necessary equipment information can be quickly extracted from among many pieces of equipment to be monitored in a large-scale plant including a lot of monitored objects. The monitoring system includes a structured equipment information storage part for storing structured equipment information including equipment information on pieces of equipment and relational information describing relations among the pieces of equipment, and a monitored equipment extraction part for extracting a set of pieces of related equipment information associated with a piece of equipment of interest based on the structured equipment information with the equipment of interest, which is separately designated, being set as a base point of extraction.

11 Claims, 34 Drawing Sheets

FIG.5

| ID | 23 |
|---|---|
| NAME | HYPOCHLORITE INJECTION PUMP1 |
| RELATION | (OMITTED) |
| NUMBER OF ATTRIBUTES | 3 |
| ATTRIBUTE NAME 1 | AMOUNT OF CURRENT |
| ATTRIBUTE VALUE 1 | AI0025 |
| ATTRIBUTE NAME 2 | PRESENCE OR ABSENCE OF FAULT |
| ATTRIBUTE VALUE 2 | DI0046 |
| ATTRIBUTE NAME 3 | OPERATION·STOP |
| ATTRIBUTE VALUE 3 | DI0047 |

FIG.6

|   | TAG NAME | SHARED MEMORY ADDRESS | UNIT | COMMENTS |
|---|---|---|---|---|
| 1 | AI0000 | 0x20000000 | m | WATER LEVEL OF WATER INTAKE WELL a |
| 2 | AI0001 | 0x20000080 | % | WATER LEVEL OF WATER DISCHARGE VALVE a |
| 3 | AI0002 | 0x20000100 | m | WATER LEVEL OF WATER INTAKE WELL b |
| ⋮ | ⋮ | ⋮ | ⋮ | ⋮ |

FIG.8

| EQUIPMENT ID | ATTRIBUTE | WEIGHT |
|---|---|---|
| 125 |  | 100 |
| 3 4 |  | 94 |
| 1 8 | 2 | 82 |
| 2 3 |  | 95 |
| ⋮ |  |  |

FIG.9 eq003.attr01 eq023.attr01 eq040.attr01 eq024 eq082.attr03 eq011.attr03

⋮

AMOUNT OF CURRENT FOR WATER INTAKE PUMP b
IS 2.43.
AMOUNT OF CURRENT FOR HYPOCHLORITE INJECTION PUMP a
IS 3.21.
AMOUNT OF CURRENT FOR HYPOCHLORITE INJECTION PUMP b
IS 0.00
:

| RELATION | WEIGHT COEFFICIENT a |
|---|---|
| CONNECTION | -3 |
| BELONG (FORWARD DIRECTION) | -8 |
| BELONG (REVERSE DIRECTION) | -9 |

| RELATION \ VIEWPOINT | GENERAL | WATER | ELECTRICAL SYSTEM |
|---|---|---|---|
| CONNECTION | −3 | −2 | −4 |
| BELONG (FORWARD DIRECTION) | −8 | −8 | −8 |
| BELONG (REVERSE DIRECTION) | −9 | −9 | −9 |
| CONTROL CONTROLLED | −7 | −7 | −7 |
| DISTRIBUTION PANEL BOARD | −7 | −9 | −2 |

FIG.19

EQUIPMENT OBJECT

| ID | |
|---|---|
| NAME | |
| IMPORTANCE | |
| RELATION | |
| NUMBER OF ATTRIBUTES | n |
| ATTRIBUTE NAME 1 | |
| ATTRIBUTE VALUE 1 | |
| ⋮ | |
| ATTRIBUTE NAME n | |
| ATTRIBUTE VALUE n | |

FIG.20

| RELATION \ VIEWPOINT | GENERAL | WATER | ELECTRICAL SYSTEM | OVERVIEW |
|---|---|---|---|---|
| CONNECTION | −3 | −2 | −4 | −3 |
| BELONG (FORWARD DIRECTION) | −8 | −8 | −8 | −9 |
| BELONG (REVERSE DIRECTION) | −9 | −9 | −9 | −8 |
| CONTROL · CONTROLLED | −7 | −7 | −7 | −7 |
| DISTRIBUTION PANEL BOARD | −7 | −9 | −2 | −9 |

| WARNING | EQUIPMENT ID | ATTRIBUTE NAME |
|---|---|---|
| A00001 | 15 | |
| A00002 | 16 | |
| A00003 | 15 | |
| A00004 | 16 | |
| | | |
| | | |

FIG.31

LIST OF CURRENT VALUES
AT $time

VALUE OF $obj1.name:
$obj1.value

VALUE OF $obj2.name:
$obj2.value

VALUE OF $obj3.name:
$obj3.value

VALUE OF $obj4.name:
$obj4.value

VALUE OF $obj5.name:
$obj5.value

LIST OF CURRENT VALUES
 AT 2000/08/25 16:24:35

VALUE OF AMOUNT OF CURRENT FOR WATER INTAKE PUMP b:
2.43

VALUE OF AMOUNT OF CURRENT FOR HYPOCHLORITE INJECTION PUMP a:
3.21

VALUE OF AMOUNT OF CURRENT FOR HYPOCHLORITE INJECTION PUMP b:
0.00

:

FIG.34 (a) DURING OFFLINE
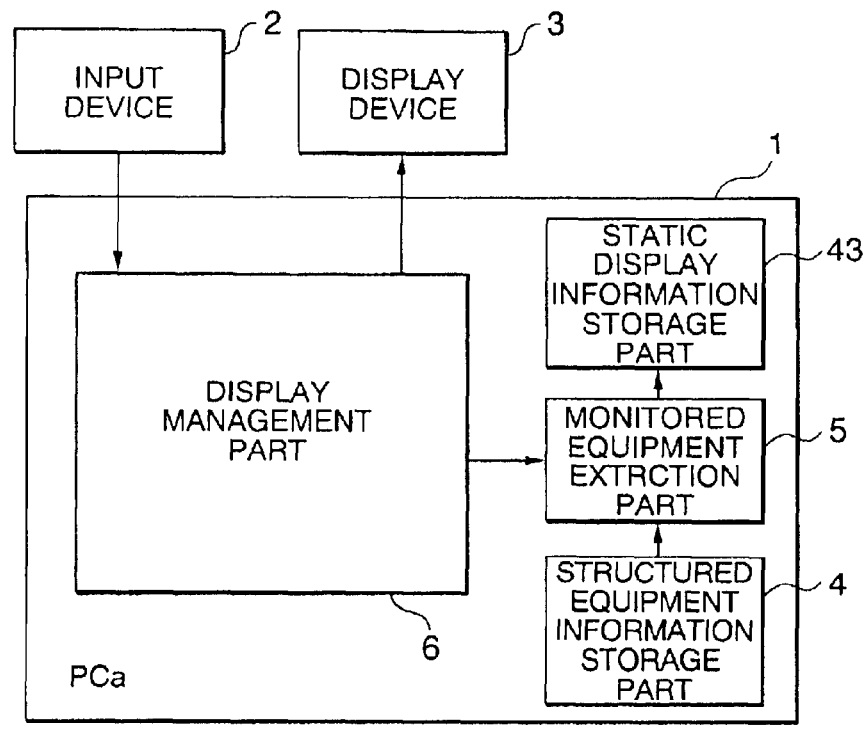
FIG.34 (b) DURING ONLINE
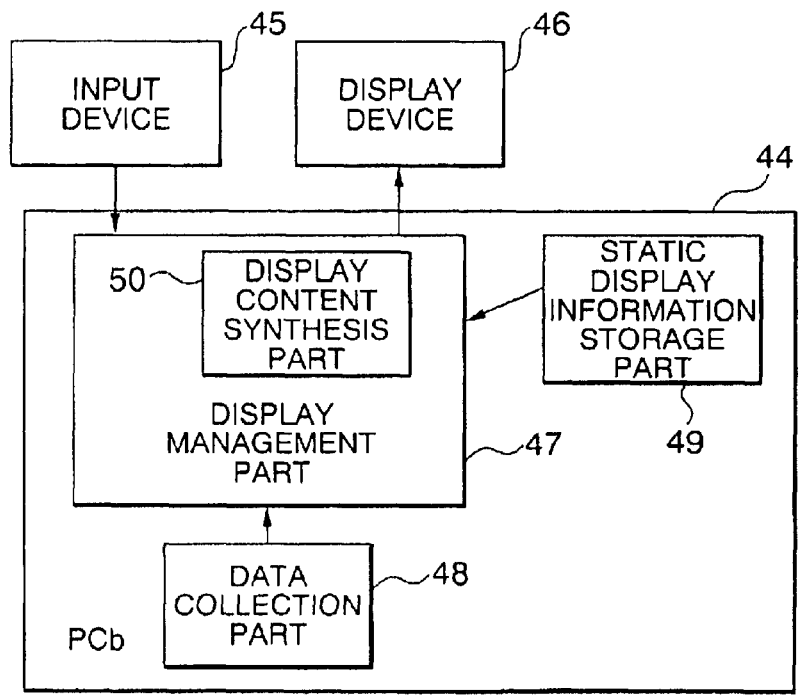

FIG.35

AMOUNT OF CURRENT FOR WATER INTAKE PUMP b
IS $eq001.attr01.
AMOUNT OF CURRENT FOR HYPOCHLORITE INJECTION PUMP a
IS $eq023.attr01.
AMOUNT OF CURRENT FOR HYPOCHLORITE INJECTION PUMP b
IS $eq048.attr01.

| No | GROUP NAME | DISPLAY INFORMATION |
|---|---|---|
| 1 | ○△EQUIPMENT | |
| 2 | ○×EQUIPMENT | |
| : | | |
| : | | |

AMOUNT OF CURRENT
FOR WATER INTAKE PUMP b
IS $eq001.attr01.
AMOUNT OF CURRENT FOR
HYPOCHLORITE INJECTION PUMP a
IS $eq023.attr01.
AMOUNT OF CURRENT FOR
HYPOCHLORITE INJECTION PUMP b
IS $eq048.attr01.
:

AMOUNT OF CURRENT
FOR WATER INTAKE PUMP c
IS $eq011.attr01.
AMOUNT OF CURRENT FOR
HYPOCHLORITE INJECTION PUMP a
IS $eq033.attr01.
AMOUNT OF CURRENT FOR
HYPOCHLORITE INJECTION PUMP d
IS $eq049.attr01.
:

DURING OFFLINE

MONITORING SYSTEM

BACKGROUND OF THE INVENTION

1. Field of the Invention

The present invention relates to a monitoring system for such as SCADA (supervisoly control and data acquisition) system, which collects measurement data, condition data and the like of equipment to be monitored, and displays them on a display device, and more particularly, it relates to a monitoring system which is provided with the function of effectively displaying the condition of a plant on a small display device when there takes place an abnormality such as failure or the like therein.

2. Description of the Prior Art

In systems for monitoring a plant or the like, the measurement data, the condition data and the like (monitor data) of the equipment to be monitored are collected and displayed on a display device. An operator always watches the display contents and confirms whether there takes place no abnormality so that upon occurrence of abnormally, he or she can take appropriate action to deal with the abnormality in accordance with the displayed contents. However, in case where what is to be monitored is on a large scale and includes a great deal of objects to be monitored, it becomes difficult to display all the contents on one screen. In such a case, conventionally, the contents to be displayed were classified into a plurality of graphical contents so that necessary graphical contents among them could be seen, thus enabling the operator to grasp the monitored information.

As an example of such a method, Japanese Patent Application Laid-Open No. 11-259780 discloses a method in which a, plurality of graphical contents are prepared beforehand, and displayed at a later time with the latest monitored data values being superposed thereon. Also, there is another method in which a plurality of pieces of equipment to be monitored are stored in a hierarchical structure, so that monitor data values can be displayed for each piece of equipment. In the former method, there are the following problems. That is, when an abnormality as predicted has occurred, the situation or condition of the abnormality can be grasped or understood with one screen, but in some cases, however, it might become necessary to confirm the current values of monitored data over several screens depending upon the condition of the abnormality, thus preventing the operator from quickly grasping the monitored data. In particular, in case of the graphical content being small, when the condition of a plant is confirmed and grasped by use of the display part of a portable terminal for example, even ten to twenty screens to say nothing of several screens are needed for confirmation, and hence it is not easy to properly decide the monitor data for which piece of equipment is to be included in each screen. In addition, it is not easy to extract necessary pieces of monitor data from a lot of screens either. Even in cases where an index is affixed to each screen, it is not easy to make appropriate selection among them if the hierarchy or depth of the index is shallow. Besides, if, on the contrary, the hierarchy is deep, it becomes difficult to look at a plurality of related screens while browsing through them. Moreover, although a method is adopted in which the entire structure is first grasped and then details thereof are confirmed, it is necessary to prepare respective screens beforehand. Additionally, when the screen is small, it is likely that the entire structure could not be displayed with one screen, and hence it might become necessary to divide the structure into a plurality of screens. Further, much labor is required for preparing a lot of these screens, too. In the latter method, though it is comparatively easy to acquire information on a certain piece of equipment to be monitored, it is generally necessary to acquire monitor data on a plurality of pieces of equipment to be monitored in case of an abnormal situation. Thus, examining a lot of pieces of monitor data one by one requires enormous efforts as in the above-mentioned case where an index is affixed to each screen.

All the above problems are due to the fact that there are too many pieces of equipment which are required to be displayed. Therefore, attempts have been made to select only a minimum number of pieces of equipment to be monitored through extraction to display the monitored data thereof. For instance, Japanese Patent No.714273 attempts to easily retrieve and set a point identification number (PID) corresponding to each input point of plant equipment based on fragmentary knowledge and memory, so that specific pieces of equipment can be extracted to display their information by designating a certain PID. Moreover, according to an article entitled "Plant Monitoring System Using WWW-Compatible Portable Terminals" published in the 61st National Conference of Information Processing Society of Japan, only those of input and output points (tags) allocated to objects on a certain screen definition which correspond to serious faults are extracted. Alternatively, among the input and output points allocated to objects on a certain screen definition, those equipment objects belonging to the input and output points which have serious fault attributes in the equipment objects are extracted to display their information by using the pieces of equipment to be monitored (equipment objects) which are represented as objects.

However, in the former extraction method, one retrieval is needed to see the monitor data of one piece of equipment to be monitored. Thus, in order to see the monitor data of a plurality of pieces of equipment to be monitored, it is necessary to perform narrowing of the monitor data many times for the respective pieces of equipment. As a result, it is not easy to sequentially retrieve the plurality of pieces of equipment, which have a certain relation to the equipment that is the origin of generating a warning and which appear to be warning-related equipment, so as to confirm or check the monitor data thereof. In particular, this becomes a serious problem in cases where a large amount of information cannot be displayed at a time due to a small graphical content.

Furthermore, in, the latter extraction method, in cases where there are a lot of equipment objects having serious fault attributes, it is practically impossible to specify which ones are given priority among those which have once been extracted. As a result, an appropriate extraction cannot be made. On the contrary, even if an operator wants to check the situation of another piece of equipment after abnormality of a certain piece of equipment has been confirmed, this equipment cannot be extracted if a serious fault attribute is not set to its equipment object.

Thus, it is difficult to properly extract a group of pieces of related equipment and display the monitored data thereof with a small number of graphical contents upon occurrence of abnormality. Therefore, it is necessary to prepare a lot of estimated graphical contents beforehand, or examine related screens for each piece of equipment or object through information retrieval or the like so as to avoid the preparation of estimated graphical contents. In particular, in cases where it is desired that the condition of a plant is able to be confirmed and grasped from any remote place by using a portable terminal, the above-described problems become more remarkable because the graphical content of the portable terminal is small.

SUMMARY OF THE INVENTION

Accordingly, the present invention is intended to obviate the problems as referred to above.

In one aspect, the present invention resides in a monitoring system including: an output device which presents monitor data to an operator; and a data processing device which has a data collection part for collecting the monitor data, processes the data collected by the monitor data collection part, and passes the data thus processed to the output device as an output content. The data processing device includes: a structured equipment information storage part for storing structured equipment information which includes equipment information on a plurality of pieces of equipment and relational information describing relations among the plurality of pieces of equipment; and a monitored equipment extraction part which roughly extracts, from structured equipment information stored in the structured equipment information storage part, equipment information and relational information on those pieces of equipment which have a prescribed relation to a piece of equipment of interest having a designation of attributes with the equipment of interest having the designation of attributes being set as a base point for extraction. The monitored equipment extraction part calculates a weight value for each of the roughly extracted pieces of equipment from equipment information and relational information on the roughly extracted pieces of equipment, and finally extracts pieces of equipment information as a related equipment information set based on the weight values. With this arrangement, it is possible to extract those pieces of equipment which are closely related to a piece of equipment of interest in an appropriate manner, whereby a narrowed or reduced number of pieces of related equipment can be output. In addition, it becomes unnecessary to prepare in advance a lot of graphical contents, which could be conceived from a relation to the equipment of interest, as fixed graphical contents. As a result, by designating and selecting a certain relation with respect to a piece of equipment according to a situation, it is possible to extract and output only a small number of pieces of related equipment which have the designated and selected relation with respect to that piece of equipment as occasion arises. Thus, it becomes easy to deal with the matters by the use of a display device of a small screen.

In another aspect, the present invention resides in a monitoring system including: an output unit which presents monitor data to an operator; a first data processing device; and a second data processing device which processes data collected, passes the data to the output device as an output content. The first data processing device includes: a structured equipment information storage part for storing structured equipment information which includes equipment information on a plurality of pieces of equipment and relational information describing relations among the plurality of pieces of equipment; a monitored equipment extraction part which roughly extracts, from structured equipment information stored in the structured equipment information storage part, equipment information and relational information on those pieces of equipment which have a prescribed relation to a piece of equipment of interest having a designation of attributes with the equipment of interest having the designation of attributes being set as a base point for extraction, the monitored equipment extraction part being further operable to set a weight value for each of the roughly extracted pieces of equipment from equipment information and relational information on the roughly extracted pieces of equipment, and finally extract pieces of equipment information as a related equipment information set based on the weight values; and a static output information storage part for storing static output information which relates a plurality of related equipment information sets, which are finally extracted by the monitored equipment extraction part with a plurality of pieces of equipment of interest including a designation of attributes being set as base points of extraction, respectively, to the plurality of pieces of equipment of interest including a designation of the attributes set as base points of extraction, respectively. The second the data processing device includes: a second static output information storage part for storing the static output information prepared by the first data processing device; a data collection part for collecting monitor data; and an output content synthesis part for extracting a related equipment information set corresponding to a specific piece of equipment of interest including a designation of attributes from the static output information stored in the second static output information storage part, the output content synthesis part being operable to synthesize an output content from the extracted related equipment information set and the monitor data collected by the data collection part and to pass the thus synthesized output content to the output device. With this arrangement, by using weight coefficient storage information and structured equipment information, it is possible to extract in advance a set of pieces of equipment closely related to a piece of equipment of interest to define an output content based thereon, so that the content of an output can be prepared by using the previously defined output content as it is or by processing it in an appropriate manner. As a result, the processing of extracting a set of pieces of related equipment information during online becomes unnecessary. Therefore, the amount of labor required for defining the output content can be reduced, and an effective extraction can be carried out.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 5 is an example of the structure of an equipment object.

FIG. 6 is a table describing the relation between tag names corresponding to attribute names and a data collection part.

FIG. 8 is a table of related equipment to be extracted, describing equipment IDs, their attribute names, and their weight values.

FIG. 9 is an output example from the monitored equipment extraction part.

FIG. 19 is an example of the structure of an equipment object according to a fifth embodiment of the present invention.

FIG. 20 is an example of weight coefficient information including an "overview" viewpoint according to the fifth embodiment of the present invention.

FIG. 31 is an example of display style information defining a display style.

FIG. 33 is an output example of a display content synthesis part according to the eighth embodiment of the present invention.

FIGS. 34(a) and 34(b) are block diagrams of a monitoring system according to a ninth embodiment of the present invention.

FIG. 35 shows an example wherein a related equipment information set is extracted beforehand by the extraction processing of a monitored equipment extraction part, and an output style is set based thereon to provide static display information.

FIG. 36 is a display information definition table where static display information is summarized for various extraction starting points.

DESCRIPTION OF THE PREFERRED EMBODIMENTS

Hereinafter, preferred embodiments of the present invention will be described in detail while referring to the accompanying drawings.

Embodiment 1.

Figure 1:
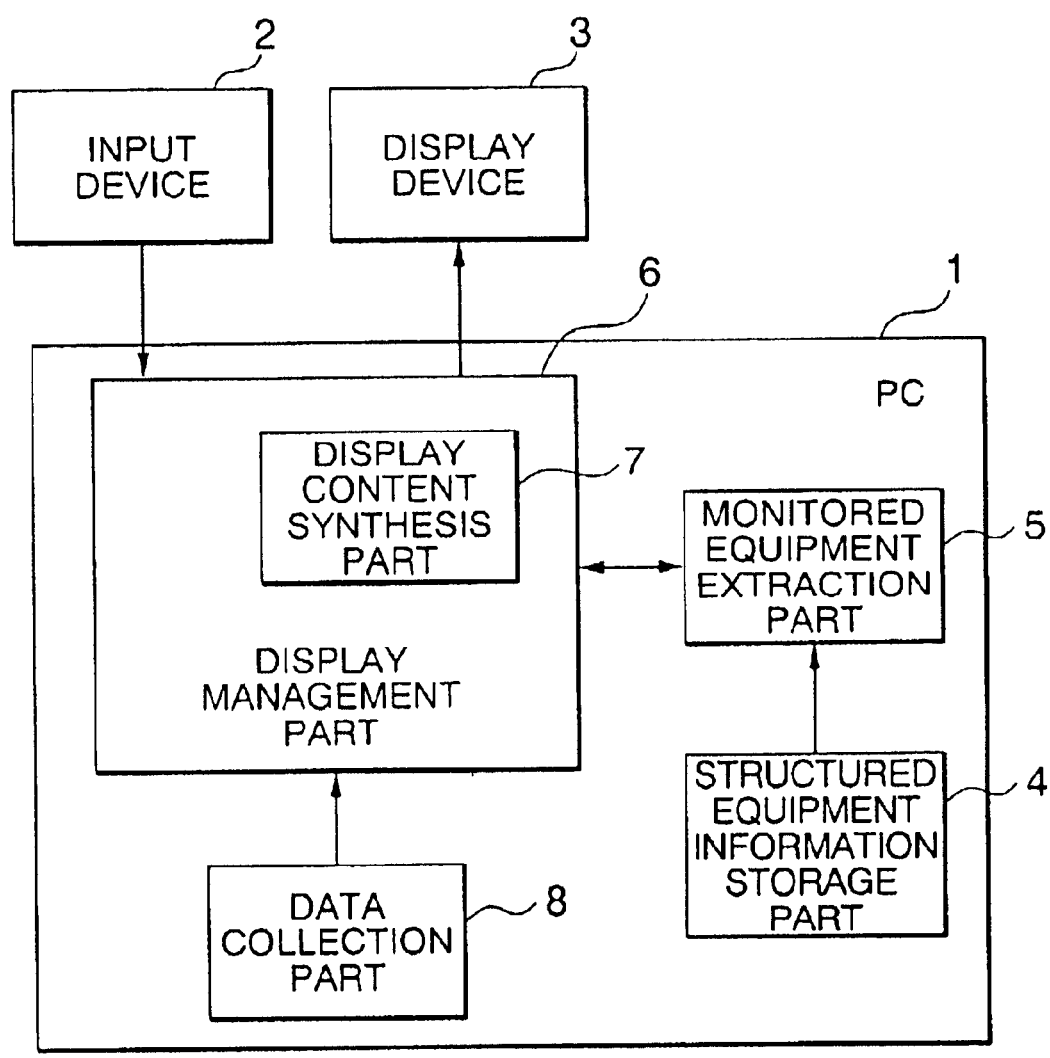
FIG. 1 is a configuration block diagram of a monitoring system according to a first embodiment of the present invention.

FIG. 1 is a block diagram which shows the configuration of a monitoring system according to a first embodiment of the present invention. In FIG. 1, the monitoring system illustrated includes a data processing device in the form of a personal computer proper 1 (hereinafter abbreviated as a PC), an input device 2 connected to the PC 1, and a display device 3 connected to the PC 1. The PC 1 comprises a structured equipment information storage part 4 for storing structured equipment information, a monitored equipment extraction part 5, a display management part 6, a display content synthesis part 7 included in the display management part 6, and a data collection part 8.

Figure 2:
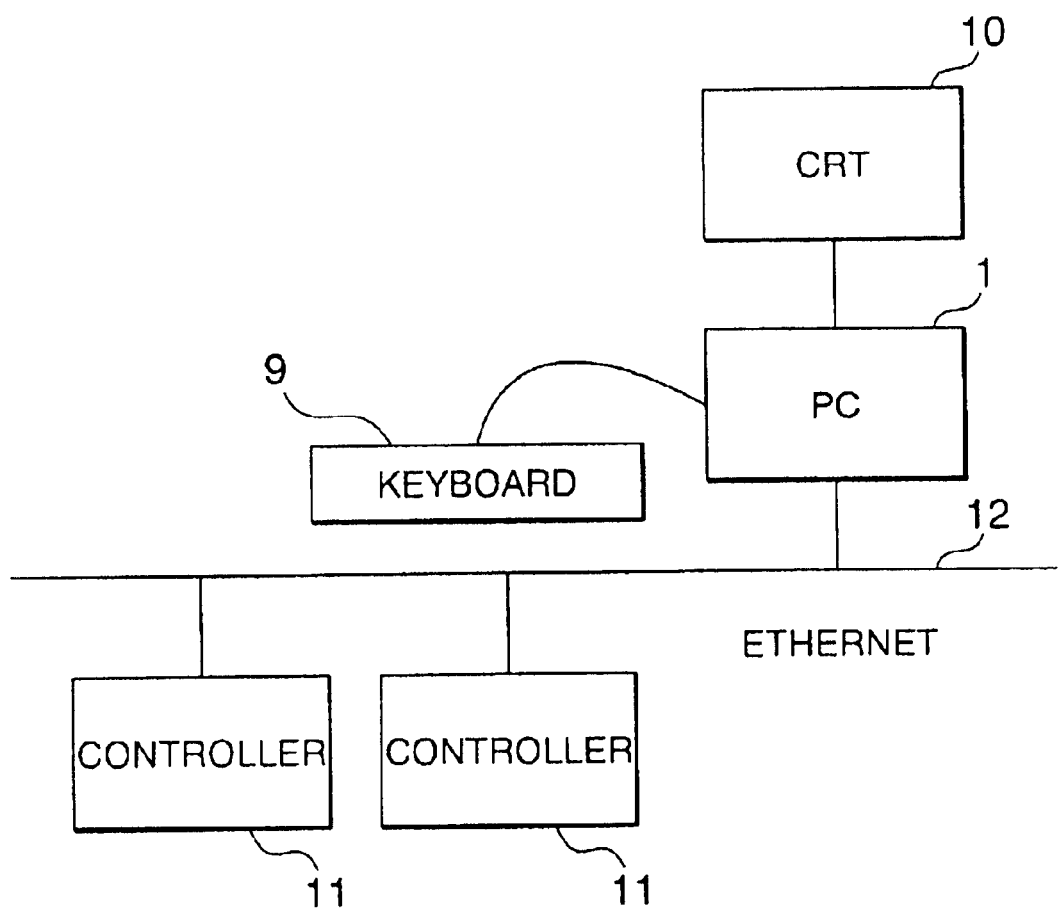
FIG. 2 is a first example of the entire configuration of the monitoring system of the present invention when it is actually operated.

An example of the entire configuration of the monitoring system when it is actually operated is shown in FIG. 2. In FIG. 2, the input device 2 in FIG. 1 comprises a keyboard 9, and the display device 3 in FIG. 1 comprises a cathode-ray tube (CRT) 10. However, in place of, or in addition to, the keyboard, the input device 2 may be, for instance, a tablet, a mouse, a speech or voice input unit, etc., or it may be any combination thereof. Also, instead of the CRT, the display device 3 may be a liquid crystal display, a plasma display, an audio or voice output device such as, for example, a speaker or the like, and it may be widely considered as a general output device. Alternatively, the output device may be considered as including output destinations such as personal computers (or computers in general), cellular phones, etc. In addition, a plurality of, or plural kinds of, output devices may be provided as in the case of the input device. Moreover, controllers 11 are generally included in pieces of equipment to be monitored, respectively, and they are connected to a network 12 such as, for instance, a local area network (LAN), Ethernet (registered trademark) or the like. The data collection part 8 of FIG. 1 periodically collects the monitor data corresponding to monitor items from each controller of FIG. 2, and holds the data in a shared memory in the PC 1. Before describing the operation of this embodiment, some of the terms used herein will be explained.

EQUIPMENT INFORMATION: This term refers to information on a certain piece of equipment to be monitored necessary to identify it from other pieces of equipment, and it comprises an equipment identification number (ID), an equipment name and the like. Here, in addition to these, the equipment information includes a reference to the relation to other pieces of equipment. Also, note that each piece of equipment information has an attribute which will be explained below.

ATTRIBUTES: This term represents a variety of kinds of information associated with each piece of equipment, and consists of the item name of an attribute (hereinafter simply abbreviated as an attribute name) and an attribute value corresponding to the item name of the attribute. Examples of such a attribute name and attribute value are a monitor item name and a monitor data value, respectively. For instance, equipment measurement information such as a current amount and a tag name of an equipment device A includes the information which shows equipment conditions such as the presence or absence of a fault and the tag name of the equipment device A, the operation or stop and the tag name of the equipment device A, and the like. Here, note that the tag name is a name defined to be able to specify a storage area such as a shared memory address or the like where a corresponding attribute value is stored. As illustrated in FIG. 6, when the attribute value is an analog input value, the tag name takes "AI" followed by a consecutive number starting from "0". This corresponds to a shared memory address or the like in which each attribute value is stored, with the unit of the attribute value and the equipment, name associated therewith being attached thereto as its comments. When the attribute value is a digital input value, the attribute value is assumed to be a consecutive number with a symbol "DI" being attached to its head. Here, note that instead of the tag name, it is possible to directly designate the address in which the attribute value is stored or the address of an object capable of providing information about the attribute value.

EQUIPMENT OBJECT: This is a term used in object oriented programming or the like. This term is the integration of a data structure (including equipment information and its attribute) corresponding to one piece of equipment to be monitored and a procedure handling its data.

Figure 3:
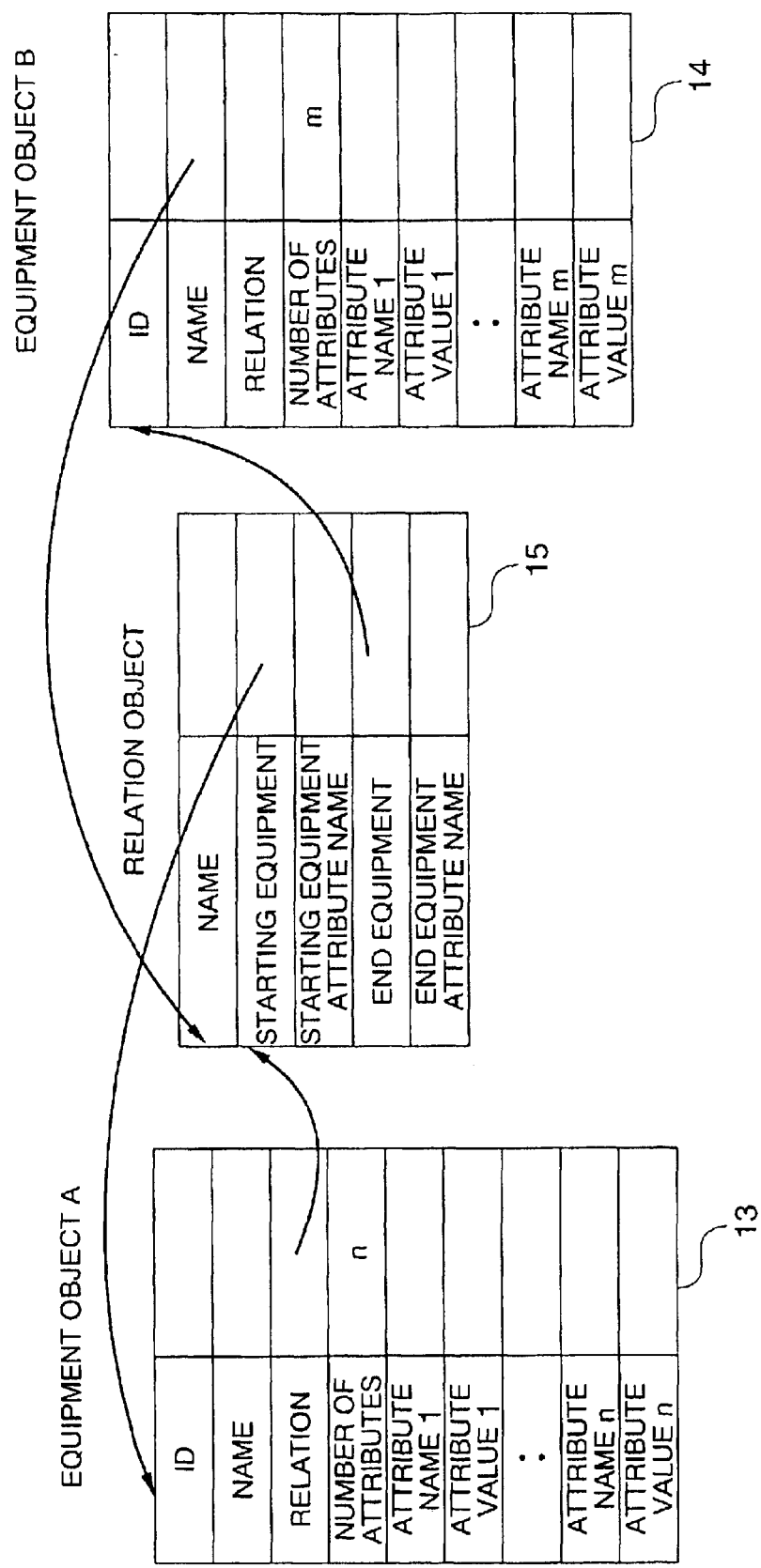
FIGS. 3(a), 3(b), and 3(c) are views showing examples of the configuration of structured equipment information.
Figure 3:
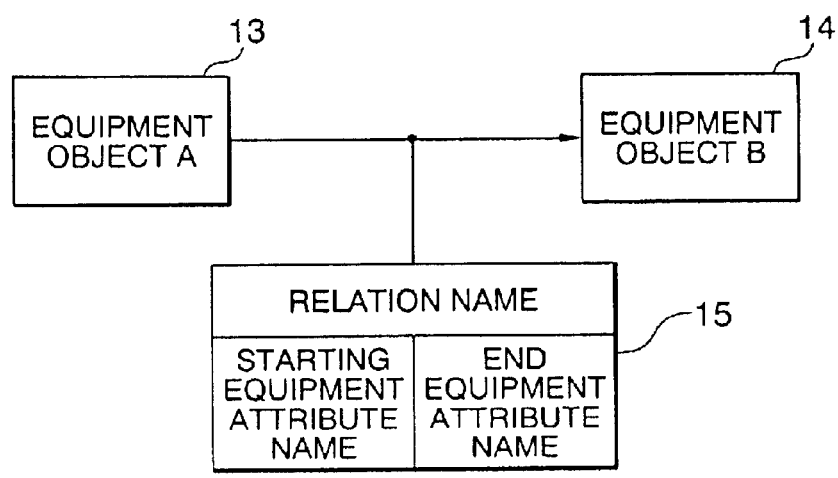
Figure 3:
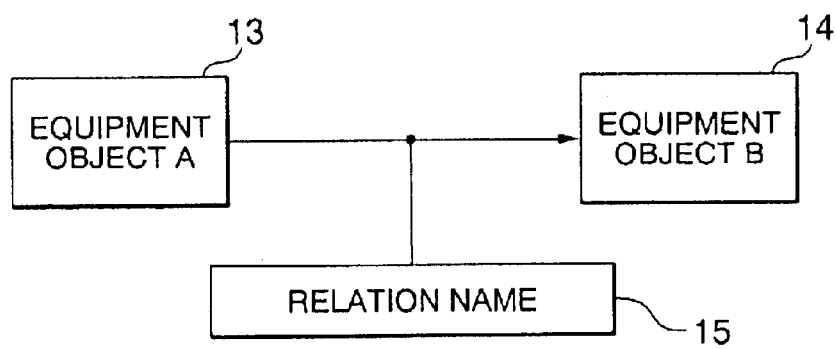

STRUCTURED EQUIPMENT INFORMATION: This term means an entire data structure which describes equipment objects and relations therebetween. A concrete/example of this is shown in FIGS. 3(*a*) through 3(*c*). In FIG. 3(*a*); it is assumed that a data structure corresponding to one piece of equipment to be monitored is an "equipment object". Also, the data structure of a relationship connecting between two equipment objects is assumed to be a "relation object". FIG. 3(*a*) shows a data structure in the case where there is a relationship between an equipment object A 13 and an equipment object B 14. Each of the equipment objects is able to store an equipment ID, a name, a reference to a relationship (a plurality of references being able to be stored), the number of attributes, attribute name 1, attribute value 1, . . . , attribute name n and attribute value n. A storage space of the memory necessary for pairs of an attribute name and an attribute value is allocated according to the number of attributes. A relation object 15 is able to store the name of a relation, a reference to a starting piece of equipment or facility, the attribute name of the starting equipment or facility, a reference to an end piece of equipment or facility, and the name of the end facility or equipment. When relations in the entire equipment are established, the attribute name of a starting facility or the attribute name of an end facility is left empty. For instance, these references are implemented as pointers in, the C or C++ language, or as references in the Java (registered trademark) language. FIG. 3(*b*) and FIG. 3(*c*) show abbreviations for the relations of FIG. 3(*a*). Usually, a relation name, a starting facility attribute name and an end facility attribute name are described, and only the names of equipment objects are described, as shown in FIG. 3(*b*). FIG. 3(*c*) shows a notation when the attribute names of both a starting facility and an end facility are absent or empty. Although in this example, equipment objects are defined as shown in FIGS. 3(*a*) through 3(*c*), they may be defined as equipment classes. Moreover, for example, attributes may be implemented as a doubly linked list of a data structure comprising attribute names and attribute values. In addition, structured equipment information may not be achieved as equipment objects but it may be achieved by a mere data structure, for instance, a structure of C language. In these cases, the same effects will be obtained with respect of the fact that equipment information (including relation references), attribute names and attribute values are described.

Figure 4:
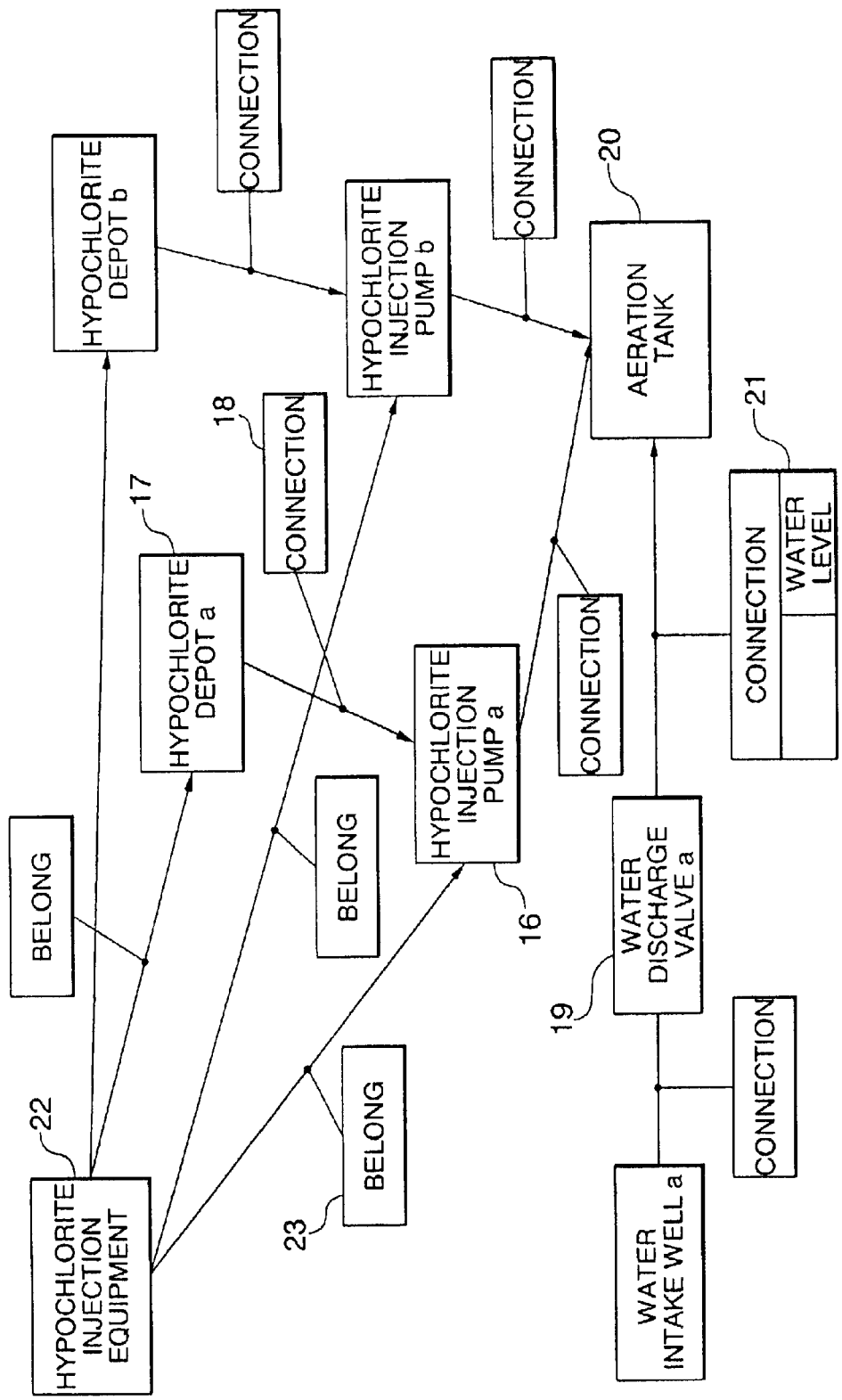
FIG. 4 is an example showing structured equipment information as a graphic structure.

FIG. 4 is one example (partial excerpt) for showing structured equipment information as a graphic structure. For instance, in this Figure, an equipment object "hypochlorite injection pump a" 16 has a relation "connection" 18 with respect to an equipment object "hypochlorite depot a" 17. In this relation, the "hypochlorite injection pump a" 16 is an end facility. Also, an equipment object "water discharge valve a" 19 has a relation "connection" 21 with respect to an attribute "water level" of an equipment object "aeration tank" 20. In this relation, the "water discharge valve a" 19 is a starting facility. In addition, the equipment object "hypochlorite injection pump a" 16 has a relation "belong" 23 with respect to an equipment object "hypochlorite injection equipment" 22. In this relation, the "hypochlorite injection pump a" 16 is an end facility. That is, this means that the "hypochlorite injection pump a" 16 belongs to the "hypochlorite injection equipment" 22.

Next, the schematic operation of the system of FIG. 1 will be described below.

The display management part 6 functions as a data processing device to generalize or control the processing of this first embodiment as explained below. The display management part 6 processes an input from the input device 2 and an output to the display device 3, and at the same time, it passes equipment (hereinafter referred to as a facility of interest) information on a facility, which becomes a base point of extraction inputted from the input device 2, to the monitored equipment extraction part 5, and receives the result of extraction carried out by the monitored equipment extraction part 5 in the form of a set of pieces of equipment information (hereinafter referred to as a related equipment information set). The monitored equipment extraction part 5 extracts the above-mentioned related equipment information set based on the structured equipment information stored in the structured equipment information storage part 4 based on the above-mentioned equipment information of interest received from the display management part 6, and passes it to the display management part 6. The display management part 6 in turn passes the related equipment information set thus received to the display content synthesis part 7. The display content synthesis part 7 prepares a graphical content based on the received related equipment information set and the monitor data of each monitored item regarding the equipment to be monitored, which is collected from the exterior of the data processing device in the form of the PC 1 by means of the data collection part 8 and which is held or stored in a storage part such as a shared memory. The display management part 6 receives the graphical content prepared by the display content synthesis part 7, and displays it with the display device 3.

Here, note that in this example, the display content synthesis part 7 is arranged in the display management part 6, but it may be configured such that the display content synthesis part 7 is arranged outside the display management part 6 so that the display management part 6 passes processing to the display content synthesis part 7, with a resultant drawing instruction being given to the display management part 6. Further, the display device 3 may be generally considered to be an output device, as previously mentioned. In that case, the display management part 6 and the display content synthesis part 7 constitute an output management part (or being able to be called an interface management part, which means controlling the input and output) and an output content synthesis part, respectively.

The structured equipment information previously described is stored in the structured equipment information storage part 4 (for instance, a storage part such as a main memory on a PC, etc.) as an equipment model of an object to be monitored by the monitoring system, like a graphic structure as shown in FIG. 4. For instance, the method of storing the structured equipment information in the storage part such as the main memory or the like in the form of a graphic structure may be a method of bringing information stored in an object-oriented database (DB) in this form into the storage part, or a method of storing an equipment item table (equipment ID, equipment name, attribute name 1, attribute value 1, . . . ) and a relation item table (relation name, starting equipment ID, starting equipment attribute name, end equipment ID, end equipment attribute name) in a file or the like and reading them into the storage portion such as the main memory, or any other similar method.

FIG. 5 is an example of the structure of the equipment object "hypochlorite injection pump a" 16. "23" is stored in the equipment ID, and "hypochlorite injection pump a" is stored in the equipment name. Also, a reference to relations (these relations being omitted in this Figure) to hypochlorite injection equipment, a hypochlorite depot and an aeration tank is stored in the form indicated in the "relation object" 15, as shown in FIG. 3(*a*). The number of attributes is assumed to be "3". The attribute name 1 and the attribute value 1 of a first attribute are "the amount of current" and a tag name of "AI0025", respectively. The attribute name 2 and the attribute value 2 of a second attribute are "the presence or absence of a fault" and a, tag name of "DI0046", respectively. The attribute name 3 and the attribute value 3 of a third attribute are "operation or stop" and a tag name of "DI0047". FIG. 6 shows a table in which tag names corresponding to attribute names and relations to the data collection part 8 are described as referred to before. The data collection part 8 refers to the value of each controller based on this conversion table between the tag names and the shared memory addresses.

Figure 7:
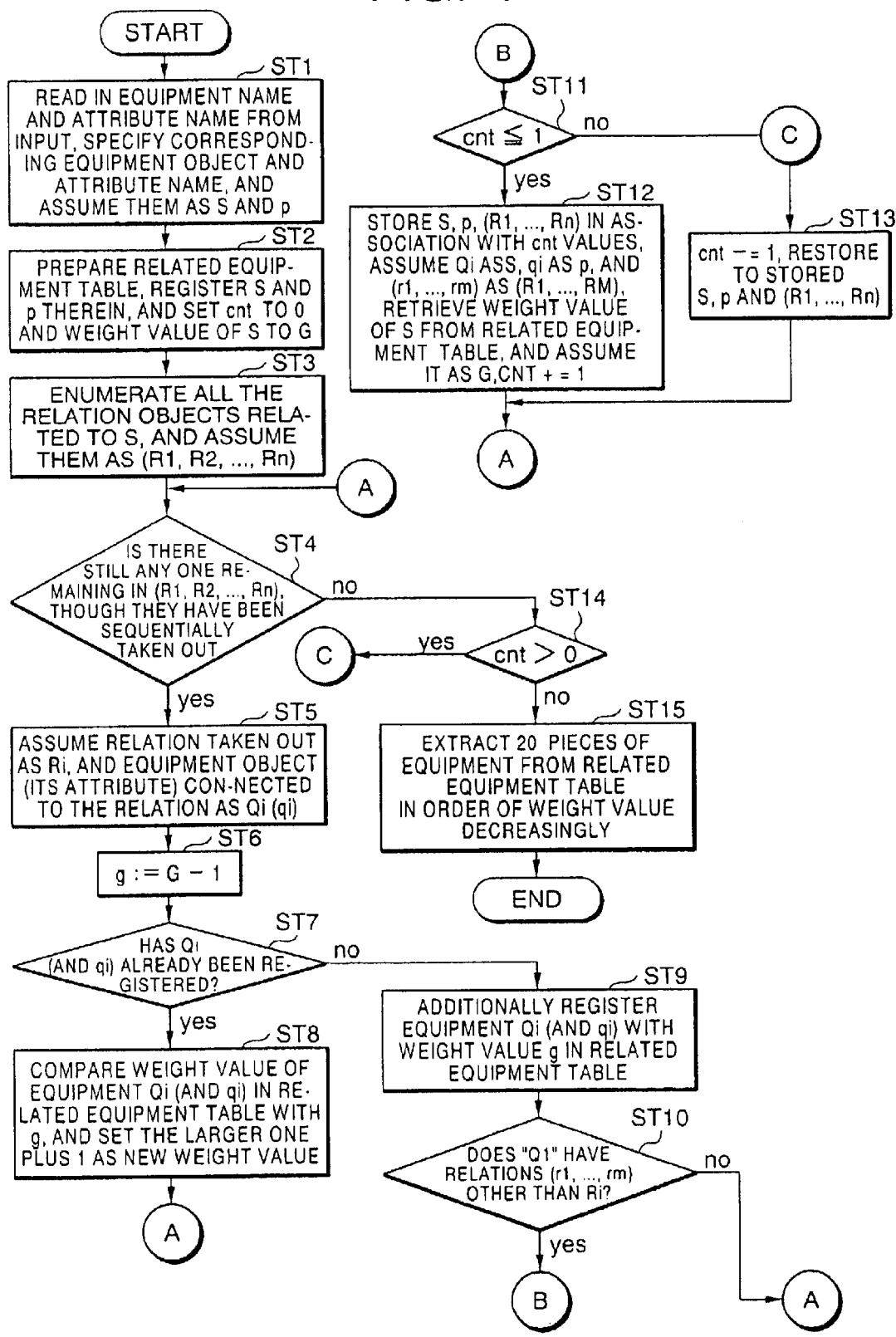
FIG. 7 is a flow chart showing the processing of a monitored equipment extraction part.

FIG. 7 is a flow chart showing the processing of the monitored equipment extraction part 5. The monitored equipment extraction part 5 performs extraction processing in which those pieces of equipment or facilities which is reached through a small number of relation objects or a plurality of sets of relations to the above-mentioned piece of equipment or facility of interest are extracted from among pieces of equipment or facilities each having a prescribed number of relation objects which are related to the piece of equipment or facility of interest with it being set as a base point. A piece of equipment or facility has a plurality of relation objects means that that equipment or facility has a more direct relation to the equipment or facility of interest. That is, it means that the number of pieces of other intervening equipment or facilities is small. On the other hand, the fact that there are a plurality of sets of relations leading to that equipment means that that equipment is a piece of more closely related equipment among a set of pieces of related equipment information, thus indicating that all of that equipment and the pieces of intervening equipment are important.

Hereinafter, the flow chart of FIG. 7 will be described in detail. First of all, in step ST1, an equipment name and, if any, an attribute name input from the input device 2 are read in under the management of the display management part 6, and they are passed to the monitored equipment extraction part 5 as a piece of equipment or facility of interest. Then, the monitored equipment extraction part 5 collates the information thus received with the structured equipment information stored in the structured equipment information storage part 4 to specify an equipment object and its attribute name (only in case of an attribute name having been input). Here, it is assumed that the equipment object is "S", and that the attribute name, if any, is "p". (Hereinafter, description will be made on the assumption that there exists such an attribute name p, but instead there may be a case where no attribute name exists.) Subsequently, in step ST2, a related equipment table as shown in FIG. 8 is prepared in the main memory of the PC 1 for instance. The related equipment table comprises data in a tabular form capable of storing equipment IDs, attribute names and their weight values. In step ST2, the equipment object, the attribute name and its weight value as specified in step ST1 are registered in the related equipment table as S, p and G (e.g., 100), respectively. The weight value G is a numerical value which is predetermined as an initial value by taking into consideration the degree of importance of each piece of equipment, etc. The absolute value of the weight value G can be arbitrarily set. In addition, a variable cnt, which is defined to increment by "1" each time there is interposed one other piece of equipment between the equipment specified and the equipment of interest which becomes a base point for extraction, is initialized to "0". Up to this is the processing of step ST2. Incidentally, note that the number of pieces of equipment to be registered as pieces of equipment (and their attributes) in the related equipment table increases as the following processing of the monitored equipment extraction part 5 advances.

In step ST3, all the relation objects associated with "S" are enumerated. That is, all the relations which are referred to in the column of "relation" in the data structure of the equipment object S (see FIG. 3(*a*) or FIG. 5) are extracted and assumed to be (R1, . . . , Rn). Then, in step ST4, relations are sequentially taken out one by one from among (R1, . . . , Rn). If there still remains one which is to be taken out, the flow advances to step ST5. If not, the flow advances to step ST14. In step ST5, the relations taken out in step ST4 and the equipment objects at their connection destinations and the attributes thereof are set as Ri, Qi, and qi. (Here, the following explanation will be made on the assumption that there is a designation of attributes for the sake of simplification though in some cases there may be no designation of attibutes.) Subsequently, in step ST6, "G−1" is substituted for the weight value g of equipment Qi (attribute qi). This means that the weight value is decremented by "1" as the relation of a piece of equipment to the equipment of interest, which is a base point of extraction, becomes more remote therefrom. The value or amount of decrement of "1" can be freely set in balance with the set value of G (i.e., 100 in this example) Thereafter, in step ST7, it is checked whether Qi (attribute qi) has already been registered in the related equipment table. If registered, the flow advances to step ST8, whereas if not registered, it advances to step ST9. In step ST8, a comparison is made between the weight value of the registered equipment Qi (attribute qi) and g (=G−1) set in ST6, and the value of the larger one of them added by "1" is set as the weight value gi of the equipment Qi (attribute qi) in the related equipment table. Thereafter, a return is performed to step ST4. Here, the addition of "1" means that the weight value is increased when a multiple reference is carried out. The value of increase of "1" can also be freely set in consideration of the balance with the above-mentioned value of decrease for the weight value.

On the other hand, in step ST9, the equipment Qi (attribute qi) extracted in step ST4 and the equipment Qi (attribute qi) set in step ST6 are additionally registered in the related equipment table with the weight value g being made "gi". Then, in step ST10, it is checked whether there are any ones other than Ri among the relations referred to by "Qi". If any, they are assumed to be (r1, . . . , rm), and the flow advances to step ST11, whereas if not, a return is carried out to step ST4. In step ST11, it is checked whether the variable cnt is "1" or less. That is, it is examined how many times tracing from the first equipment object S is carried out. As a result, if the variable cnt is "1" or less, the flow advances to step ST12, whereas if not, it advances to step ST13. In step ST12, first of all, S and (Rj, . . . , Rn) (j=i+1) are stored and preserved for temporary saving in association with the value of the variable cnt at that time. Then, in order to utilize a loop for Ri, the weight value gi of the equipment Qi (attribute qi) is retrieved from the related equipment table while assuming Qi and qi to be S and p, respectively, as well as (r1, . . . , rm) to be (R1, . . . , Rm). The value gi thus obtained is regarded as, and substituted for, G of equipment S (attribute p). Here, note that the multiplicity of the loop processing from ST4 onward is assumed to be variable cnt, which is incremented by "1". The increment of the variable cnt by "1" means that the relation of a piece of equipment related to the loop processing at this time from the equipment of interest which becomes a base point of extraction is moved away therefrom by one piece of equipment.

Thereafter, a return is performed to step ST4, so that all the processing for the relation (r1, . . . , rm) is repeated from step ST4 to step ST12 or ST13 by using the loop for (R1, . . . , Rm). The multiprocessing of such a loop is carried out until the variable cnt becomes equal to "1" under the condition set in step ST11. That is, when the multiprocessing has been executed to a point where the relation of a piece of equipment to the equipment of interest, i.e., the base point of extraction, becomes such that there is interposed one piece of equipment therebetween, a shift from step ST11 to step ST12 is prevented by the condition in step ST11, and the flow proceeds from step ST11 to step ST13 in order to prevent a further expansion of extraction to such a piece of equipment whose relation to the equipment of interest becomes more remote. The value of the variable cnt is decremented by 1. Here, S and (Rj, . . . , Rn) (j=i+1), which were stored and preserved for temporary saving, are restored to the original values in association with the value of the variable cnt thus decremented, and the remainder of the last (or one time before) loop processing is continued. As a result, in accordance with the processing in steps ST8 and ST9, the equipment IDs, the attributes and the weight values of the equipment of interest A, which becomes the base point of extraction input by an operator, a first group of pieces of equipment (and attributes) B (cnt=0) having direct relations to the equipment of interest A, and a second group of pieces of equipment (and attributes) C (cnt=1) having direct relations to the first group-of equipment B are registered in the related equipment table in such a form as to prevent mutual overlapping, as shown in FIG. 8. Note that the figures recorded in the column of attributes of FIG. 8 represent the ordinal number of each attribute. Attributes with no figure recorded correspond to relation objects with no attribute being set.

If in step ST4 it is determined that there is no reminder of the relation Ri, then in step ST14, a determination is made based on the value of the variable cnt at that time as to whether the loop processing is the completion of the final loop or the completion of the processing of an intermediate loop among the multiple loops. If the final loop has not yet been completed, that is, if cnt>0, a return is performed to step ST13. On the other hand, if the final loop has been completed, the value of the variable cnt should be returned to zero (cnt=0), and hence it is assumed in step ST14 that cnt>0, then the flow advances to step ST15. Here, for instance, 20 pieces of equipment having greater weight values are sequentially extracted from among those pieces of equipment (and attributes) listed in the related equipment table. Note that such an extraction method in step ST15 is merely one example. For instance, there is another method in which when the number of registrations exceeds a specified number while performing extraction or registering into the related equipment table, a new registration thereafter is made by deleting a piece of equipment having the smallest weight value among the weight values of, the already registered pieces of equipment and those of new pieces of equipment to be registered. In any case, the method of extracting a prescribed number of pieces of related equipment among a set of pieces of related equipment that are ordered according to the weights of their relations to the equipment of interest by using what criteria may be determined, in consideration of the condition of distribution of pieces of equipment of the monitoring system, the number of pieces of equipment which are able to be displayed at a time, etc.

In the processing of FIG. 7, equipment objects and relation objects are seen as nodes and arcs, respectively, of a graphic structure, and those nodes which are connected through arcs with a starting node, which acts as a starting point, are extracted. Although one example of extraction methods has been shown herein, another method of extracting subgraphs from a graph may be employed with the similar effects. In addition, although the condition of cnt≦1 is set in step ST11 in FIG. 7, this value (i.e., 1) in the condition is to indicate how many pieces of other related equipment, which are interposed between the equipment of interest and a specific piece of related equipment, are to be extracted, and hence this value can be changed. As this value increases, the number of pieces of intervening equipment increases so that pieces of equipment having more remote relations to the equipment of interest become the objects to be extracted.

Although the processing of FIG. 7 has been described as a single process which includes no other procedures, it may be constructed for instance such that the processes from step ST4 to step ST13 are combined into a single procedure, wherein the step ST12 is assumed to recursively call this procedure after step ST3, and the step ST13 is assumed to end this procedure. If describing these processes in a programming language, according to the function of its language processor, it is generally possible to automatically store equipment S, its attribute p, relations (R1, R2, . . . , Rn), the number of relations n, etc., in a stack.

An example of outputting the processing of the monitored equipment extraction part 5 is shown in FIG. 9. In this example, those pieces of equipment which have been extracted are each output to one line by using the equipment ID and the ordinal number of the attribute of each equipment object. For instance, "eq023" on the second line represents an object having an equipment ID of 23, that is, "hypochlorite injection pump a" 16 in FIG. 5, and the first attribute represents "the amount of current", as can be seen from FIG. 5. This is output in step ST15 in FIG. 7. Note that the output in FIG. 9 is one example, and another displaying method may be acceptable.

Figure 10:
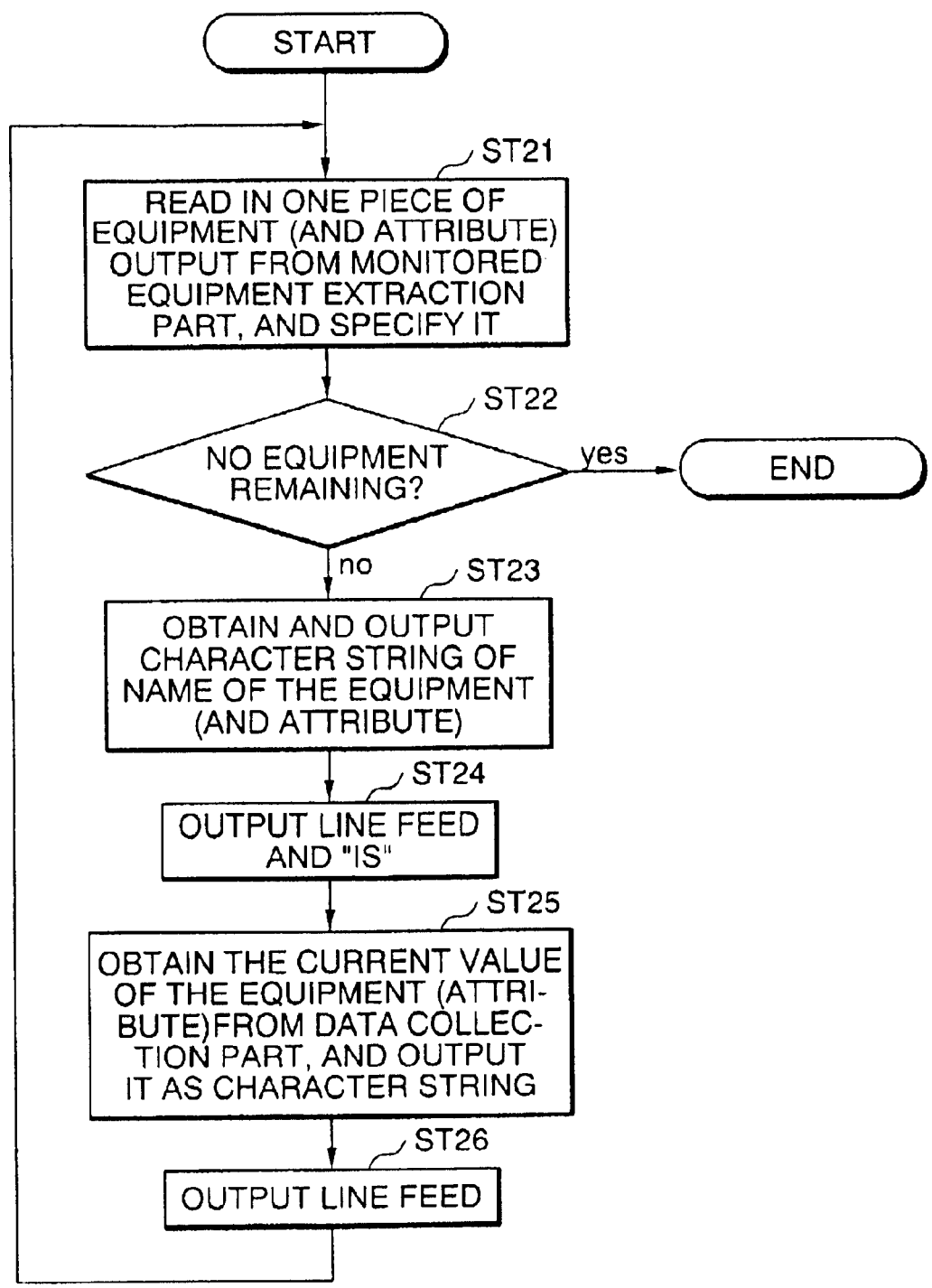
FIG. 10 is a flow chart of the processing of a display content synthesis part.
Figures 11, 12:
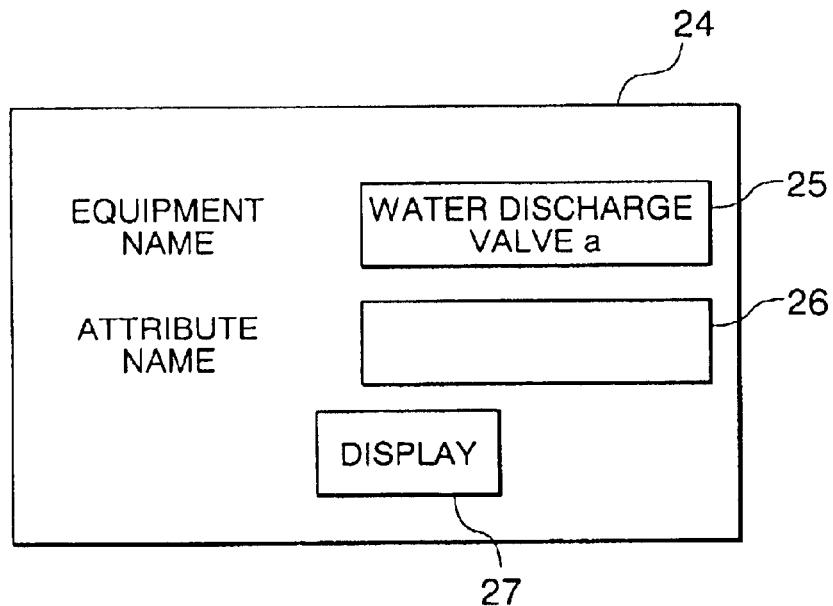
FIG. 11 is one example of the output result of the display content synthesis part.
FIG. 12 is an example of an input screen for inputting a piece of equipment of interest which becomes the base point of extraction.

FIG. 10 shows a flow chart of the processing of the display content synthesis part 7. First of all, in step ST21, the output of the monitored equipment extraction part 5 illustrated in FIG. 9 is read in by one line so as to specify the equipment (attribute) extracted. In step ST22, it is determined whether one line has been read in step ST21, and if so, the flow advances to step ST23, whereas if not, that is, if there remains no equipment to be read, the processing ends. In step ST23, the name of the equipment (attribute) thus read in is obtained from a corresponding equipment object, and output as a character string. Subsequently, in step ST24, a line feed character and "IS" are output as a character string. Then, in step ST25, the current value of the equipment (its attribute) is obtained from the data collection part, and output as a character string. In step ST26, a line feed character is output and a return is carried out to step ST21. FIG. 11 shows one example of the output result of the display content synthesis part 7. For pieces of equipment with no attribute specified, the first attribute or all the attributes thereof may be displayed for instance.

FIG. 12 shows an input screen 24 that is displayed by the display management part 6 so as to permit a user or operator to input a piece of equipment of interest, which becomes a base point of extraction. From this screen, the operator can input the name (or tag name) of the equipment of interest and, if necessary, its attribute name into an equipment name input area 25 and an attribute name input area 26, respectively. Also, there is a display button 27 on which the operator can place a focus and press an "Enter" key for example, thereby executing a display command. That is, extraction processing is started based on the input equipment name (and attribute name) . Here, note that if a pointing device such as a mouse or the like is provided as an input device (e.g., if a mouse is provided), the operator can also execute a display command by placing a mouse cursor on the display button 27 and pressing a mouse button (e.g., a left button).

Figure 13:
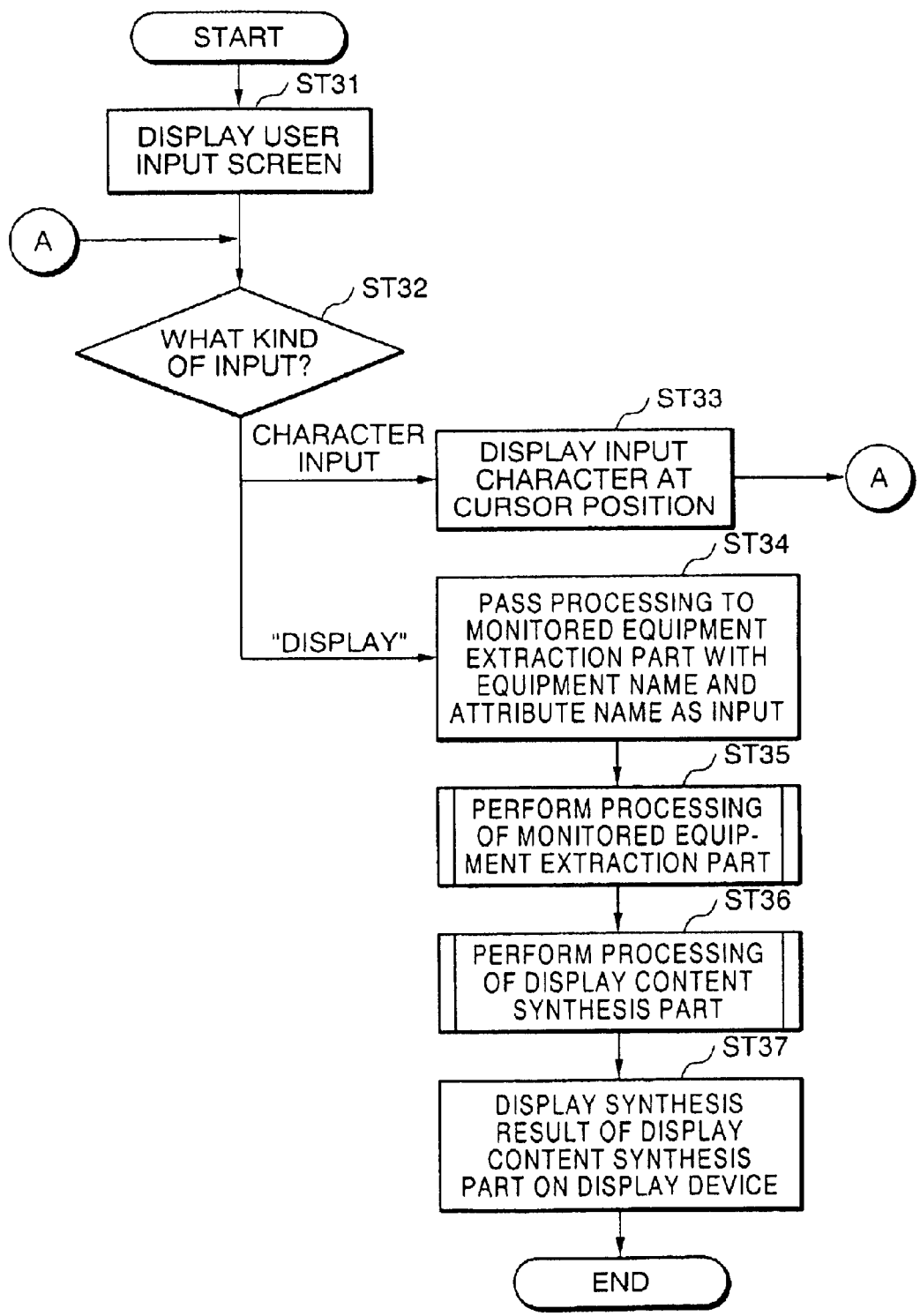
FIG. 13 is a flow chart of the processing of a display management part.

FIG. 13 is a flow chart of the processing of the display management part 6. The processing of the monitoring system of the present invention including the above-mentioned input operation through the input screen 24 is managed and carried out by the display management part 6, In step ST31 in FIG. 13, the user or operator performs an input operation in the manner as described above while displaying the user input screen 24 shown in FIG. 12 with the display device 3. Then, in step ST32, it is examined as to what is input by the user. If the user's input is characters, then in step ST33, the input characters are displayed on the screen at the cursor position, and a return to step ST32 is carried out. On the other hand, if the user's input performed a display command in step ST32, the contents input to the equipment name input area 25 and the attribute name input area 26 are passed to the monitored equipment extraction part 5 as respective inputs in step ST34. Then, in step ST35, the processing of the monitored equipment extraction part 5 is carried out according to the flow chart of FIG. 7. In step ST36, the extraction result of the monitored equipment extraction part 5 is passed to the display content synthesis part 7, and the processing of the display content synthesis part 7 is carried out, as explained with reference to FIG. 10. Then, in step ST37, the processing result of the display content synthesis part 7 is displayed on the screen of the display device 3 in a form exemplarily illustrated in FIG. 11.

Thus, with the provision of the structured equipment information storage part which stores structured equipment information describing the relations between equipment information and pieces of equipment, and the monitored equipment extraction part which extracts the pieces of equipment related to the designated equipment of interest by using the structured equipment information, it is possible to properly extract a set of pieces of equipment information which are closely related to the equipment of interest without performing such an operation as examining related screens in each case through retrieval works or the like to confirm information on a lot of pieces of equipment. As a result, the number of pieces of related equipment can be narrowed so as to output an appropriately reduced number of pieces of related equipment. In addition, it becomes unnecessary to beforehand prepare, as fixed graphical contents, a multitude of graphical contents estimated from the relations to a certain piece of equipment, which would otherwise be carried out conventionally. Therefore, it is possible to extract and output only those pieces of equipment which have specific relations such as designated attributes or the like with respect to the equipment of interest as required simply by giving an instruction to select a particular piece of equipment in accordance with a situation.

In addition, in cases where it is necessary to define and prepare the content of an output beforehand, it is possible to extract those pieces of equipment which are closely related to a certain piece of equipment, and prepare the output content by using the result of the extraction for the definition of the output content as it is, or by processing or modifying it in an appropriate manner. As a consequence, the labor for defining the output content is substantially reduced, thereby making it possible to decrease the number of processes or steps for preparing fixed graphical contents as compared with the prior art. Furthermore, by designating and selecting specific relations to a certain piece of equipment according to a situation, it is possible to output only a (generally) small number of pieces of equipment having the designated and selected specific relations to the certain piece of equipment as required. As a result, even a small graphical content can fulfill the requirement to a satisfactory extent. This means that portable terminals can be built in or used as part of the monitoring system. This is common to other embodiments which will be described later.

Although in this embodiment, a personal computer (PC) is used as a data processing device, the same effects can be achieved by use of other general-purpose computers such as an EWS (engineering workstation).

Embodiment 2.

Figure 14:
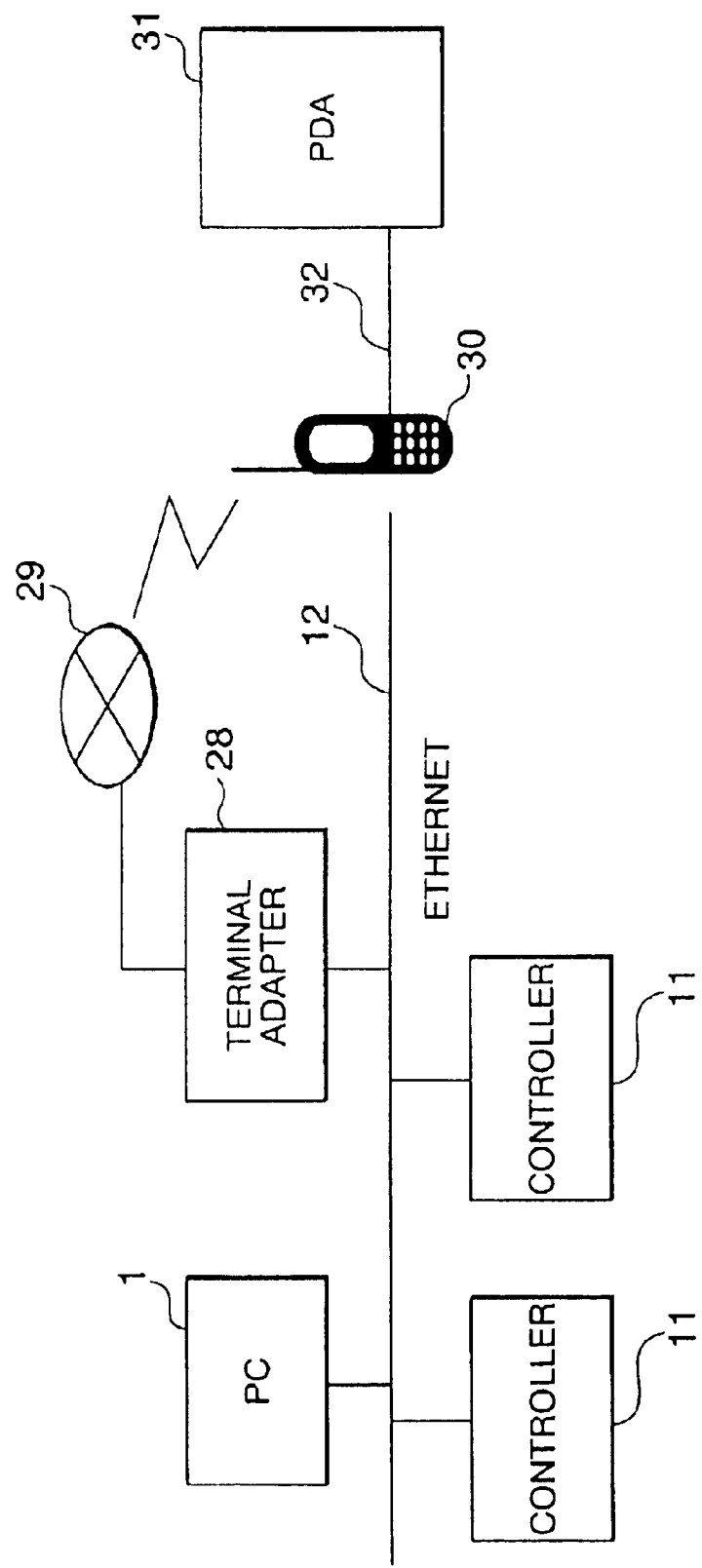
FIG. 14 is a second example of the entire configuration of a monitoring system according to a second embodiment of the present invention when it is actually operated.

FIG. 14 shows an example of the entire configuration of a monitoring system according to a second embodiment of the present invention. The configuration of FIG. 14 is the same as that of FIG. 2 added by the following component parts while omitting the keyboard 9 and the CRT 10. That is, the added components include a terminal adapter 28 (with a router function) connected to an Ethernet (registered trademark) 12, a public network 29 connected with the Ethernet 12, a portable or cellular phone 30 capable of communications via the public network 29, and a PDA (portable information terminal) 31 connected to the portable or cellular phone 30 through a serial connection line 32 or the like.

With this configuration, the PDA 31 is provided with the input device 2 and the display device 3 of FIG. 1, and the functions of the PC 1 of this embodiment other than this are the same as those of the above-mentioned first embodiment. Thus, the structures and the processing of the structured equipment information storage part 4, the monitored equipment extraction part 5, the display management part 6, the display content synthesis part 7 and the data collection part 8 are the same as those of the first embodiment. What is different from the first embodiment is that the synthetic result of the display content synthesis part 7 is sent to the PDA 31 through communications via the cellular phone 30, the PDA 31 having a function of receiving and displaying the synthetic result. Here, note that the cellular phone 30 and the PDA 31 may be replaced with a cellular phone having the display function of obtaining the synthetic result of the display content synthesis part 7 through communications and displaying it.

According to this embodiment, there will be obtained the same effects as in the first embodiment, thus making it possible to display useful information even with a terminal device of a small screen such as a PDA or the like capable of displaying a relatively small amount of content thereon at a time. In addition, in the prior art displaying method using previously fixed graphical contents as described before, even if these fixed graphical contents were prepared beforehand, when a display device of a small screen is used, it is not easy to arrange appropriate pieces of information on the small screen in such a manner that they can be seen at a glance. Therefore, there has been a problem that in order to enable appropriate information to be displayed even with a display device of a small screen, it is necessary to presume various cases and prepare a vast number of fixed graphical contents in advance. However, according to this second embodiment, it is not necessary to prepare a great number of fixed graphical contents, thus solving this problem. Moreover, it becomes easy to grasp the condition of a plant by use of a display device with a small screen. As a result, this embodiment will open the way for enabling portable terminals to be utilized as part of the monitoring system, thus making it possible for an operator to confirm and grasp the condition of the plant from any remote place.

Embodiment 3.

Although in the first embodiment, the incremental or decremental value of a weight for each relation of a related piece of equipment is common or constant irrespective of the kind of "relation", it is able to be changed according to the kind of "relation" in a third embodiment of the present invention.

Figures 15, 16:
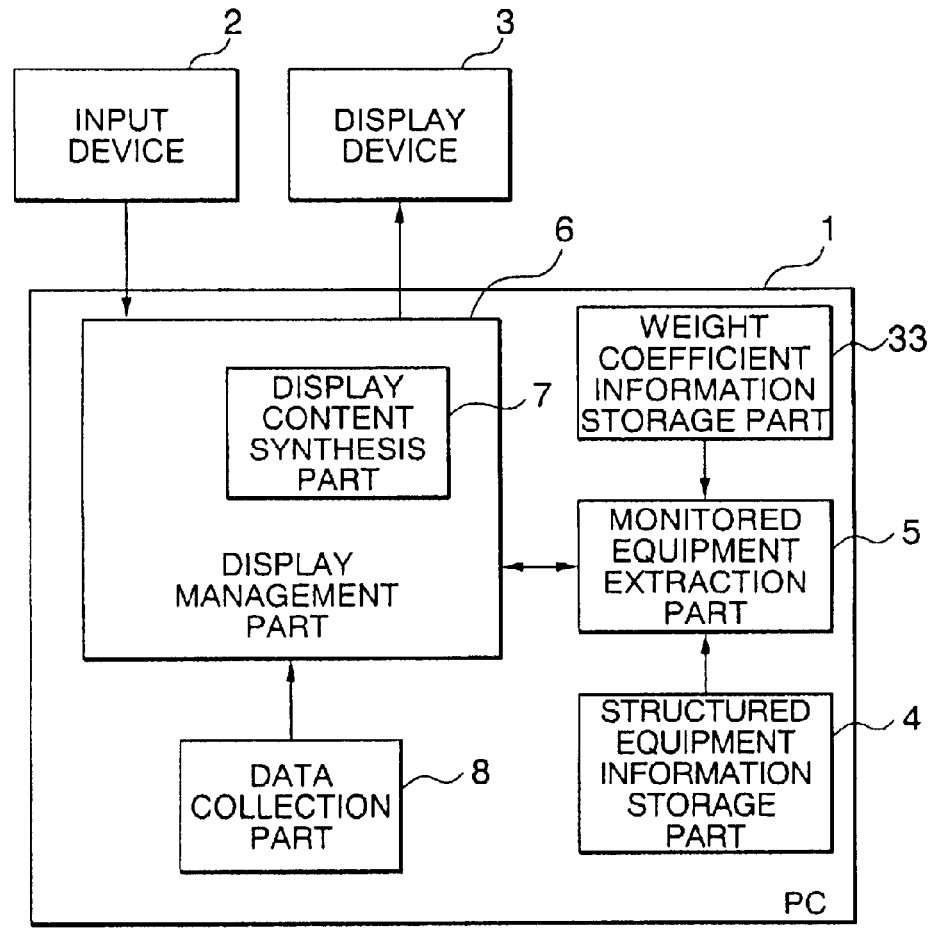
FIG. 15 is a configuration block diagram of a monitoring system according to a third embodiment of the present invention.
FIG. 16 is a view showing an example of the structure of weight coefficient information.

FIG. 15 is a block diagram which shows the configuration of a monitoring system according to a third embodiment of the present invention. This third embodiment includes, in addition to all the components of the first embodiment as shown in FIG. 1, a weight coefficient information storage part 33 for storing weight coefficient information, which is used for specifying a weight coefficient for each kind of "relation". FIG. 16 shows the structure of the weight coefficient information. The coefficient information storage part 33 stores the correspondence of "relations" and weight coefficients in the form of a table. In this table, for instance, the weight coefficient of a relation "connection" is set to "−3". In addition, the weight coefficient may be defined in consideration of the direction of a relation. For instance, different weight coefficients may be defined in a forward direction (so-called "including" relation) and a reverse direction (so-called "included" relation) of a "belong" relation. The figures in this table are exemplary ones, and can be set to optimal values respectively in accordance with various conditions such as the set value of the weight value G described in the first embodiment, the magnitude of the incremental or decremental value of the weight value G, the number of pieces of equipment, and the size of the graphical content of the monitoring system. Note that the method of achieving weight coefficient information may be defined as a procedure for example, instead of a tabular form as shown in FIG. 16, as long as weight coefficients are obtained from the kind of a "relation".

The flow chart of the processing of the monitored equipment extraction part 5 is basically the same as that of FIG. 7, but step ST6 is changed as follows. In the method of obtaining a weight value g in step ST6, the weight coefficient a of a relation Ri is obtained from a column of weight coefficients shown in FIG. 16 stored in the weight coefficient information storage part 33, and the weight value g of this equipment Qi (its attribute qi) is assumed to be "G+a". In the first embodiment, "a" is set commonly for all "relations".

According to this third embodiment, the monitored equipment extraction part can extract pieces of equipment closely related to a certain piece of equipment by the use of weight coefficient information and structured equipment information in accordance with the degree of importance which is comprehensively determined in consideration of the degree of importance according to the kinds of relations between the pieces of equipment. Accordingly, it is possible to extract the information that the user wants to learn by narrowing the information more accurately.

Embodiment 4.

Figures 17, 18:
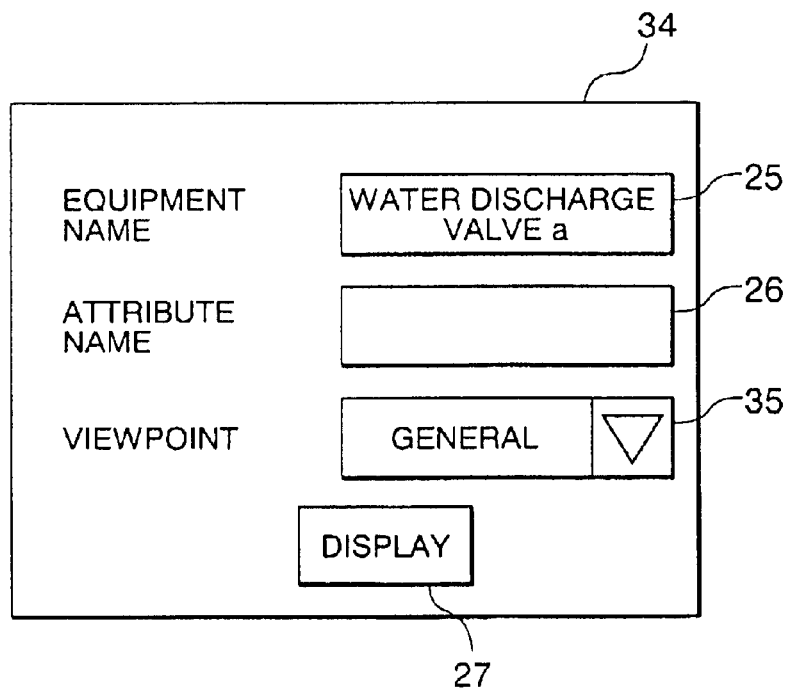
FIG. 17 is a view showing an example of the structure of weight coefficient information according to different viewpoints.
FIG. 18 is an example of a user input screen related to viewpoint-specific weight coefficient information.

In a fourth embodiment of the present invention, the weight coefficient set for each "relation" can be further set according to various points of view. In this case, the weight coefficient information introduced in the third embodiment includes weight coefficients which are set according to various viewpoints, as shown in FIG. 17, which illustrates weight coefficient information in a tabular form. Here, note that the term "viewpoint" indicates a "water" system, an "electrical" system, etc., for example. This is based on an idea that weight coefficients for the kinds of "relations" is likely to differ according to an "electrical system", a "water" system, etc., for example. Therefore, by changing the viewpoint, the comprehensive or total weight value of all the pieces of related equipment will become different, and hence pieces of equipment to be extracted will also be different.

A viewpoint of "general" indicates weight coefficients when the viewpoint is not particularly designated or specified. Note that the method of achieving weight coefficient information may be defined as a procedure for example, instead of a tabular form as shown in FIG. 16, as long as weight coefficients are obtained from the kind of a relation and a viewpoint. Incidentally, the weight coefficients are set to optimal values respectively in accordance with various conditions such as the set value of the weight value G described in the first embodiment, the magnitude of the incremental or decremental value of the weight value G, the number of pieces of equipment, and the size of a graphical content of the monitoring system.

The configuration and operation of the monitoring system of this fourth embodiment are the same as those of FIG. 15. However, the weight coefficient information stored in the weight coefficient information storage part 33 is weight coefficient information set according to viewpoints, that is, viewpoint-specific weight coefficient information. FIG. 18 shows a user input screen 34. In this Figure, the equipment name input area 25 and the attribute name input area 26 are the same as those of FIG. 12. A reference numeral 35 denotes a viewpoint input part by which a user can set a viewpoint in a pull-down menu form (e.g., when a right-hand arrow is selected, there is displayed a list of candidate character strings from which appropriate selection can be made). This is merely one exemplary form of the input method, and any other appropriate forms may be employed. For instance, one screen where the names of a piece of equipment and its attribute are input and another screen where a viewpoint is input may be provided so as to separately input these items.

The flow chart of the processing of the monitored equipment extraction part 5 in this fourth embodiment is basically the same as that of FIG. 7, but differs therefrom in the following. First, the processing of reading a viewpoint k is added to the processing in step ST1 of FIG. 7, and additionally, the weight coefficient a in an equation for calculating the weight value g in step ST6 is replaced by a kind-of-relation-specific and viewpoint-specific weight coefficient a as shown in FIG. 17. Consequently, the weight values for pieces of related equipment are set in consideration of differences in the weight coefficients between the kind of relation and the viewpoint.

The flow chart of the processing of the display management part 6 in this fourth embodiment is basically the same as that of FIG. 13, but as a result of the input determination processing in step ST 32, it additionally includes the processing of a "selection input" corresponding to the input of a viewpoint from a pull-down menu. As the processing at that time, added between steps ST33 and ST34 is a flow in which a character string selected in a selection input menu is displayed as a display character string, and then a return to step ST32 is carried out. In addition, in step ST34, a "viewpoint" is added to an input content which is to be passed to the monitored equipment extraction part 5.

According to the fourth embodiment, a factor of importance is given in the form of a weight coefficient or weight value based on the degree of importance for each kind of a relation between pieces of equipment and that for a viewpoint designated or specified in each extraction. As a result, more appropriate pieces of related equipment can be selected from a certain viewpoint. Thus, it becomes possible to extract and grasp equipment information more accurately based on a viewpoint desired by the user.

Embodiment 5.

A fifth embodiment of the present invention is intended to provide a monitoring system which allows one to look at the conditions of major pieces of equipment in a facility such as, for example, a plant or the like in a macroscopic point of view thereby to take an overview of the entire facility by selecting and emphatically displaying a representative piece of equipment in each area (in which a plurality of pieces of equipment belong to a certain piece of equipment) from among a plurality of pieces of equipment therein. To this end, important equipment information is defined, and the weight values corresponding to such information are made greater than others, and at the same time, an "overview" is set as a viewpoint in order to take an overview of the entire facilities. Whether a certain piece of equipment is important is defined in an equipment object thereof. The viewpoint of "overview" is set independently of the viewpoint of "general" thus far explained. In the first through fourth embodiments, those pieces of equipment which are directly and closely related to a certain piece of equipment are extracted from a microscopic point of view. In contrast to this, according to a macroscopic point of view, the viewpoint-specific weight coefficients in the fifth embodiment differ from those in the previous embodiments. In this sense, the viewpoint of "overview" is newly established.

FIG. 19 shows the structure of an equipment object in the fifth embodiment. This corresponds to the equipment object A13 of FIG. 3, for instance, in the first embodiment. In FIG. 19, an item of "importance" is added as important equipment information in addition to the information as shown in FIG. 3. It is assumed that the value of "TRUE" or "FALSE" or information equivalent thereto can be set herein. Such important equipment information is set as "TRUE" for important equipment for extraction, but as "FALSE" for unimportant equipment among pieces of equipment to be monitored.

Moreover, the weight coefficient information in this embodiment is the one added by a viewpoint of "overview" from the reason already described, as shown in FIG. 20. By selecting the viewpoint of "overview", a kind-of-relation-specific weight coefficient, which is set on the assumption that an overview of the entire facilities is to be taken as referred to above, is selected. In addition, this selection can be used as a trigger for referring to the item of "importance" in FIG. 19.

Figure 21:
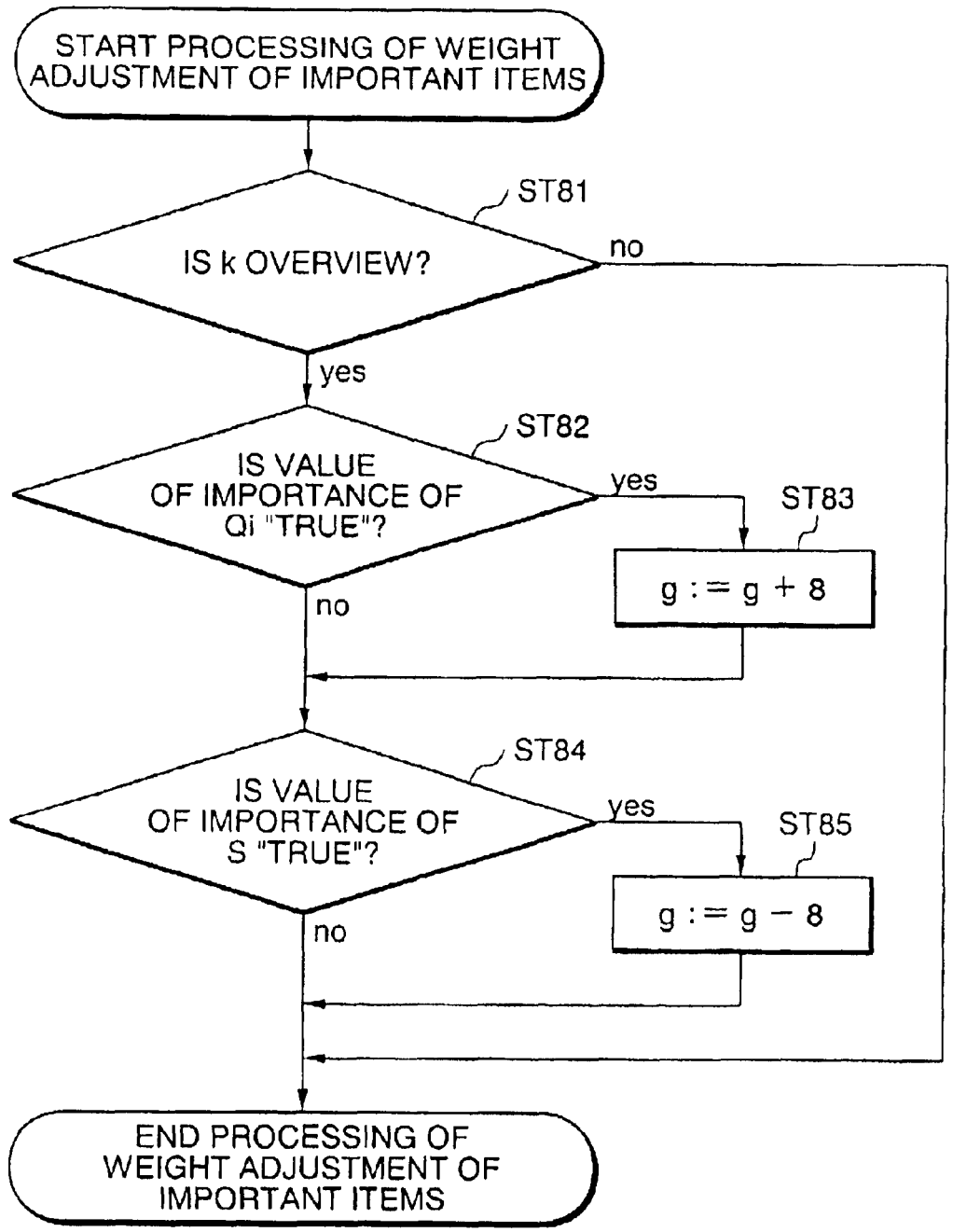
FIG. 21 is a flow chart of the weight adjustment processing of important items according to the fifth embodiment of the present invention.

The flow chart of the processing in the monitored equipment extraction part 5 of the fifth embodiment is basically the same as that of FIG. 7, but it differs therefrom in the following. That is, similar to the above-mentioned fourth embodiment, after step ST6 which is changed to an equation of calculating weight values by using the viewpoint-specific weight coefficient a, the "processing of adjusting the weights of important items" is added, and thereafter, the flow proceeds to step ST7. The flow chart of the "processing of adjusting the weights of important items" is shown in FIG. 21. In this example, the selection of "overview" is used as a trigger for referring to the item of "importance".

Accordingly, first in step ST81, it is checked whether a viewpoint k is "overview". If it is "overview", then in step ST82, it is examined whether the item of "importance" of an equipment object Qi at a connection destination is "TRUE". If so, in step ST83, the weight g is incremented by "8" for instance. Thereafter, in step ST84, it is examined whether the value of the item of "importance" of a piece of equipment S, which becomes the base point of extraction, is "TRUE". If so, in step ST85, the weight g is decremented by "8" for instance. This is due to the fact that the sign of the weight value "8" was changed in consideration of the designation of an important item of the equipment which becomes the base point of extraction and for the purpose of preventing a resultant double designation of the equipment.

The incremental or decremental value of "8" of the weight can be freely set in consideration of the balance with those of other weights. If the viewpoint k is not "overview" in step ST81, the flow proceeds to the next step without performing the "important item weight adjustment processing". Here, note that though the processing of FIG. 21 has been explained as a separate procedure so as to make clear the contrast thereof with other examples, it may be embedded into the above-mentioned modified flow chart of FIG. 7.

The configuration of the monitoring system according to the fifth embodiment is the same as that of FIG. 15. However, this is different from the system configuration of FIG. 15 in that the structured equipment information has an "importance" item and the processing of the monitored equipment extraction part 5 includes a partially added process as referred to above. In this example, a trigger for making reference to whether a certain piece of equipment is important depends on whether a viewpoint of "overview" has been selected. However, the item of "importance" of each equipment object may always be referred to, or a flag may be set for that purpose. Moreover, in this example, important equipment information is set in such a manner that the item of "importance" of each equipment object has either a value of "TRUE" or "FALSE". However, for example, "overall importance", "water system importance", "electrical system importance" and the like are additionally defined as viewpoints. For example, among the important items, the first bit of an important attribute is allocated to the "water system importance", and a second bit thereof is allocated to the "electrical system importance", such allocations being stored. In the weight value adjustment processing of FIG. 21, when k is one of these importance in step ST81, the flow is made to advance to step ST82. Also, by making determinations in steps ST82 and ST83 based on whether a bit corresponding to that viewpoint in the value of the item of "importance" is "TRUE", it becomes possible to perform weighting of various viewpoints from various aspects in addition to the viewpoint of an "overview".

According to this embodiment, by defining important information, which indicates whether each piece of equipment is important, in structured equipment information, the monitored equipment extraction part is able to extract those pieces of equipment which are closely related to a certain piece of equipment by using weight coefficient storage information and the structured equipment information while taking account of weight coefficients in consideration of the kinds of relations and a viewpoint desired at that situation, as well as important information set in each piece of equipment. Accordingly, it becomes possible to extract information that a user wants to learn much more accurately.

Embodiment 6.

Figures 22, 23:
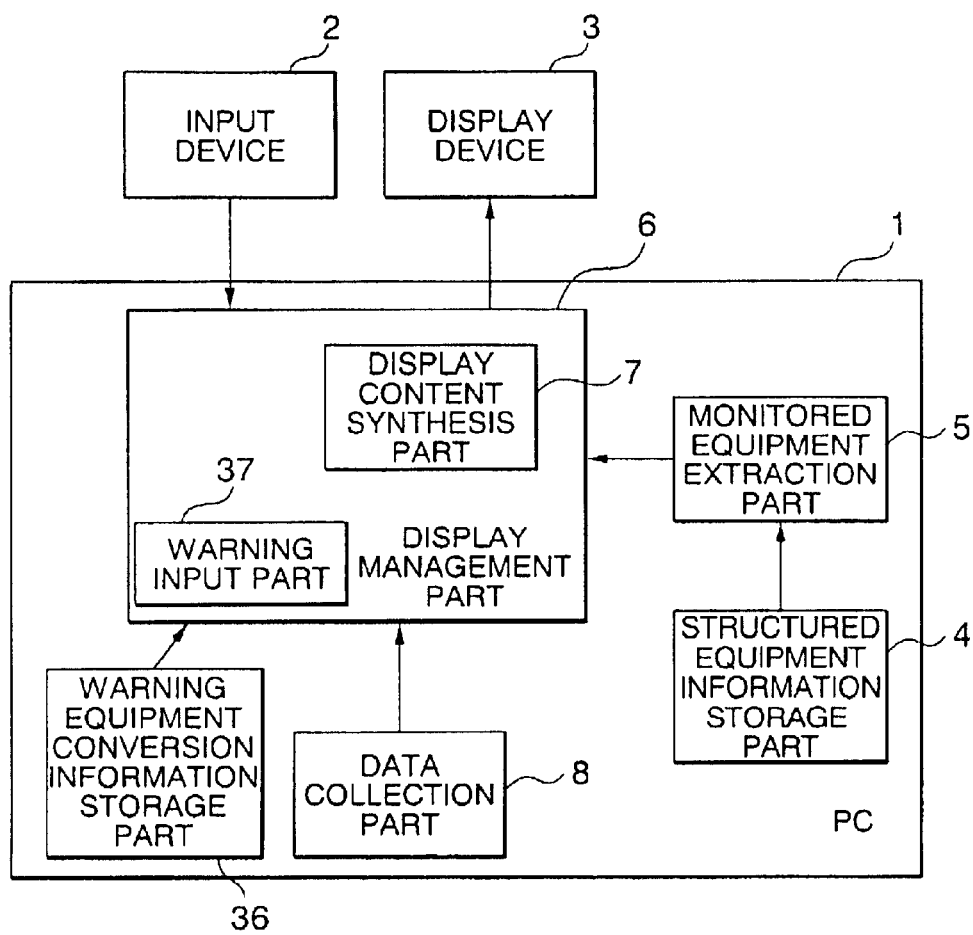
FIG. 22 is a configuration block diagram of a monitoring system according to a sixth embodiment of the present invention.
FIG. 23 is an example of warning equipment conversion information in which warnings and corresponding pieces of equipment and their attributes are defined.

In a sixth embodiment of the present invention, a related equipment information set is extracted with a piece of equipment related to a warning being set as the equipment of interest, which becomes the base point for extract. FIG. 22 is a block diagram of the configuration of a monitoring system according to this embodiment. FIG. 22 is basically the same as FIG. 1, but differs in the following. That is, the PC 1 is further provided with a warning equipment conversion information storage part 36 which stores warning equipment conversion information. The display management part 6 includes a warning input part 37 which sets, based on warning information input thereto, a piece of equipment of interest, which relates to a warning and becomes the base point of extraction, and its attribute while referring to the warning equipment conversion information of the warning equipment conversion information storage part 36. The warning input part 37 has the function of setting the equipment of interest, and hence it can be called an equipment-of-interest designating means in a broad sense. The monitored equipment extraction part 5 extracts, as a related equipment information set, a set of pieces of related equipment information based on the structured equipment information stored in the structured equipment information storage part 4 based on the equipment-of-interest information input from the warning input part 37.

Each piece of warning equipment conversion information is defined as including a warning, a piece of equipment and its attribute corresponding to that warning. This has, as one example, a data structure as shown in FIG. 23. FIG. 23 illustrates a correspondence table including correspondence among warnings, equipment IDs, and attribute names. In this table, for instance, the equipment ID of a piece of equipment corresponding to a warning "A00001" is 15 and has no attribute name. When a warning is generated, a piece of equipment and its attribute corresponding to the warning can be extracted by referring to this table. Here, note that though in this example, the warning equipment conversion information is represented by a tabular form for convenience of explanation, it is preferably stored in a hash table so that more speedy retrieval can be made.

Figure 24:
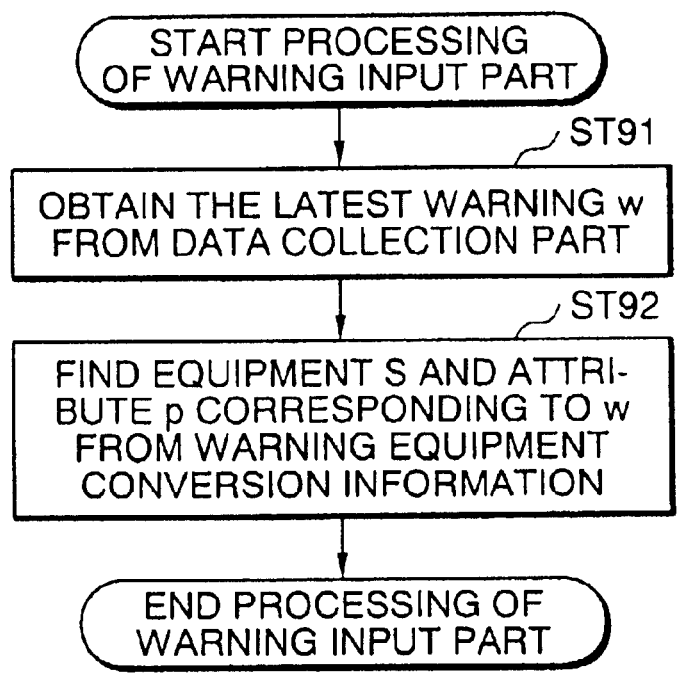
FIG. 24 is a flow chart of the processing of a warning input part according to the sixth embodiment of the present invention.

A flow chart of the processing of the monitored equipment extraction part 5 in the sixth embodiment is quite the same as that of the processing of FIG. 7 though the input of the equipment of interest (and its attribute) is different from the case of FIG. 7. Thus, the processing in step ST1 of FIG. 7 is replaced by the processing of the warning input part as shown in FIG. 24. Here, note that in all the other embodiments thus far described, the step ST1 or its corresponding processing can be replaced by the processing of FIG. 24.

In FIG. 24, in step ST91, the latest warning is first acquired from the data collection part 8, and it is assumed to be "w". Then, in step ST92, an equipment ID and an attribute name corresponding to "w" are determined by referring to the warning equipment conversion information of the warning equipment conversion information storage part 36, and an equipment object S or equipment S and its attribute p are specified from the structured information of the structured equipment information storage part 4. This equipment S becomes the equipment (and attribute) of interest.

Figure 25:
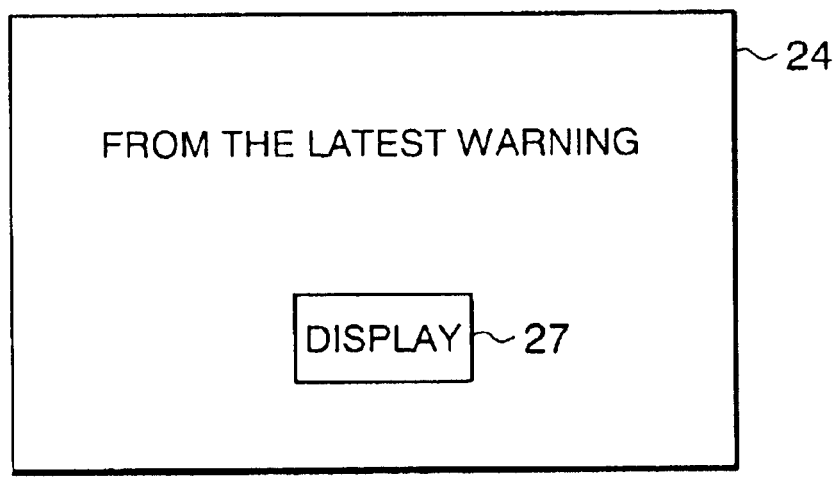
FIG. 25 is an example of a user input screen according to the sixth embodiment of the present invention.

FIG. 25 is a modified form of the user input screen 24. Here, the equipment of interest and its attribute have already been specified, and hence there is no need of manually inputting these pieces of information. Thus, an input column as shown in FIG. 12 is not displayed. Here, there is shown, as one example, the case where by selecting a display button 27, a display command is executed to display a message "from the latest warning".

Figure 26:
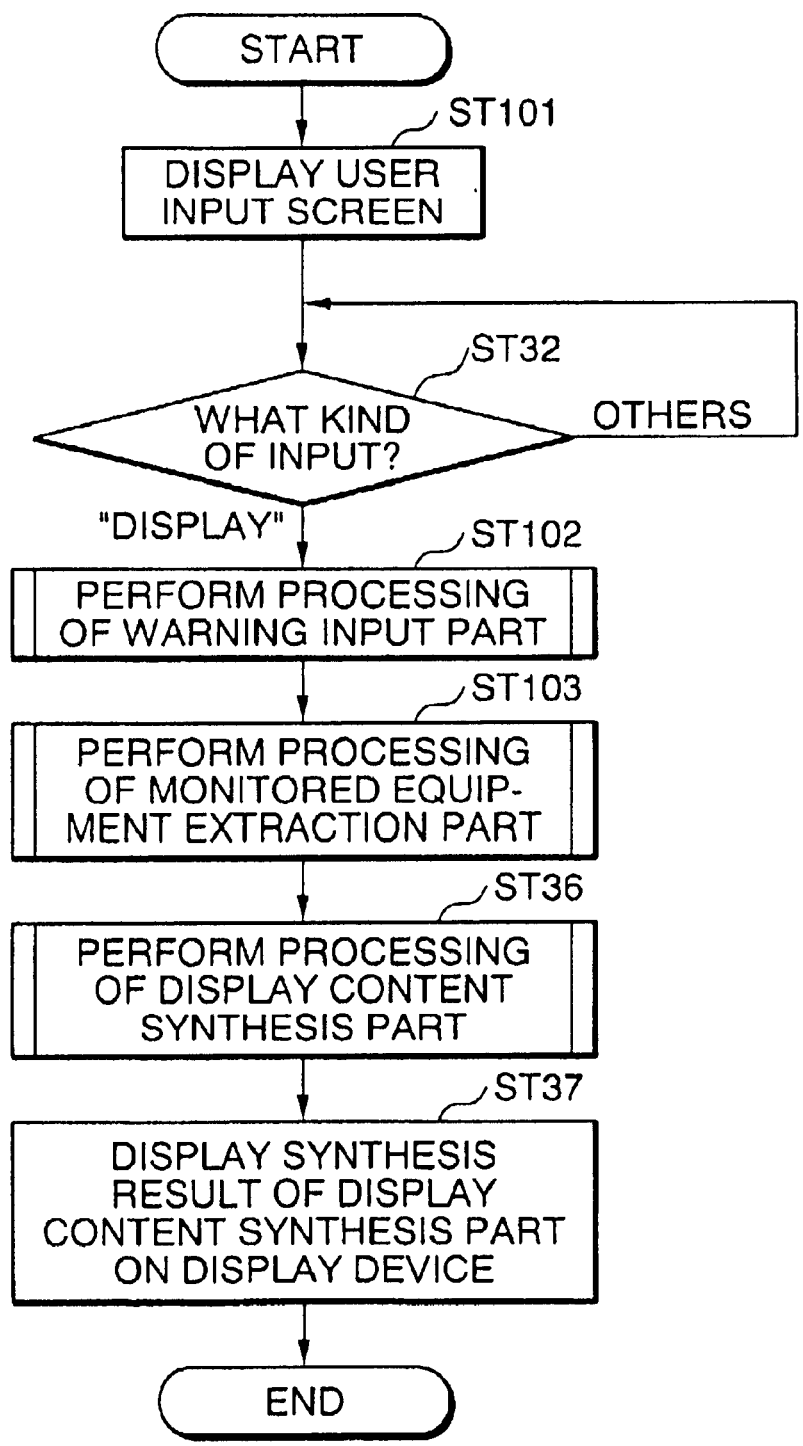
FIG. 26 is a flow chart of the processing of a display management part according to the sixth embodiment of the present invention.

FIG. 26 is a flow chart of the processing of the display management part 6, which corresponds to FIG. 13 of the first embodiment.

First of all, in step ST101, a user input screen 32 is displayed, and then, a user's input is waited for in step ST32. When the type of a user's input is a display command, the flow advances to step ST102. In step ST102, the processing is passed to the monitored equipment extraction part 5. Thereafter, the flow advances to step ST103, and the processing as in FIG. 13 is carried out from the step ST103 onward.

According to this sixth embodiment, it is possible to set a piece of equipment of interest by referring to the latest warning without user's inputting and designating the equipment of interest which becomes the base point for extraction.

Accordingly, those pieces of equipment (and attributes) which are closely related to the warning can be extracted promptly and accurately so that necessary information can be obtained quickly and effectively even with a display device of a small screen.

Embodiment 7.

In a seventh embodiment of the present invention, it is possible to make selection between the case where a piece of equipment which becomes the base point for extraction is a piece of equipment relating to a warning as described with reference to the sixth embodiment and the case where a piece of equipment which becomes the base point for extraction is manually input by a user as referred to in the first through fifth embodiments. Also, in addition to this, when the equipment related to a warning is extracted, it is possible to set, as a new point of view, a viewpoint which is to be first used upon generation of the warning.

Figures 27, 28:
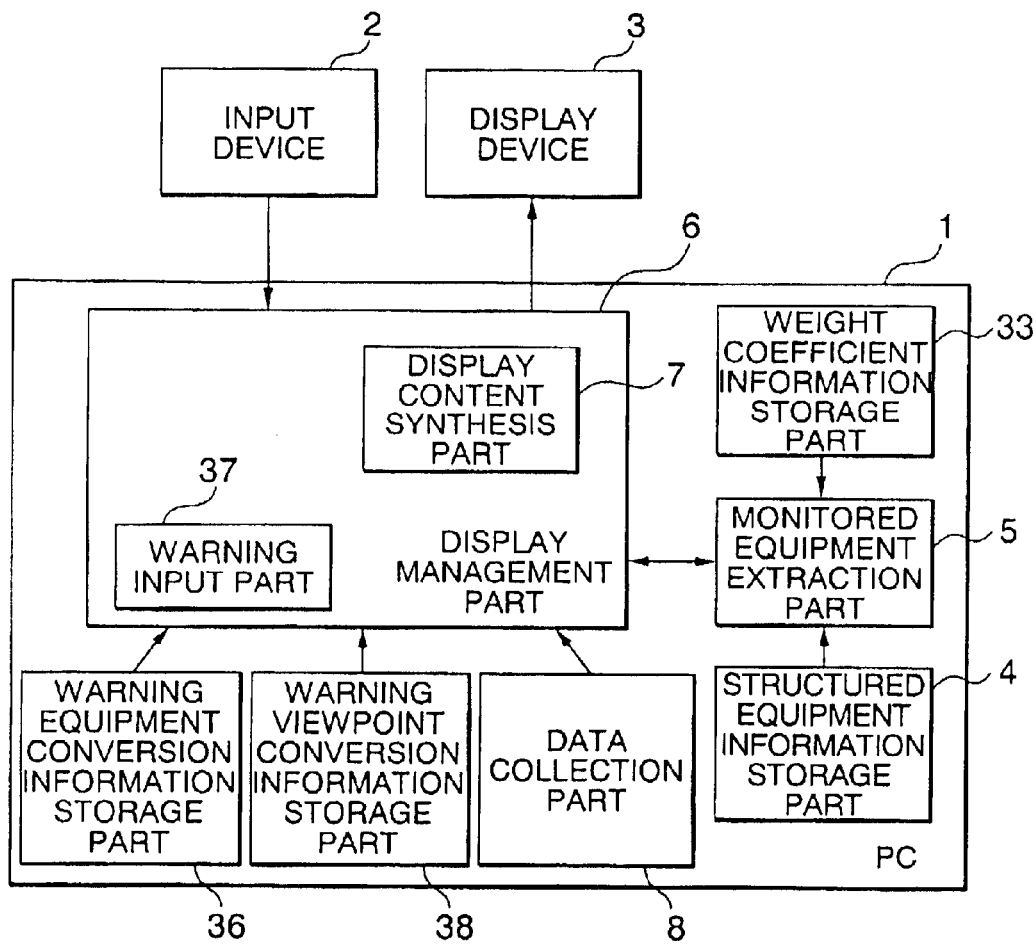
FIG. 27 is a configuration block diagram of a monitoring system according to a seventh embodiment of the present invention.
FIG. 28 is an example of the data structure of warning viewpoint conversion information according to the seventh embodiment of the present invention.

FIG. 27 is a block diagram of the configuration of a monitoring system according to this embodiment. In FIG. 27, added to the PC 1 of FIG. 22 are a weight coefficient information storage part 33 as introduced in FIG. 15 and a warning viewpoint conversion information storage part 38 for storing warning viewpoint conversion information in which a viewpoint to be first used upon generation of a warning is set for each kind of the warning.

FIG. 28 shows the data structure of the warning viewpoint conversion information. The warning viewpoint conversion information serves to set warnings and a viewpoint to be first used upon generation of each of the warnings in a tublular form. In this Figure, for example, the viewpoint corresponding to a warning "A00001" is "water". Note that though the warning viewpoint conversion information is shown in a tabular form in this example, it need not be limited to this, as already pointed out in the foregoing.

Figure 29:
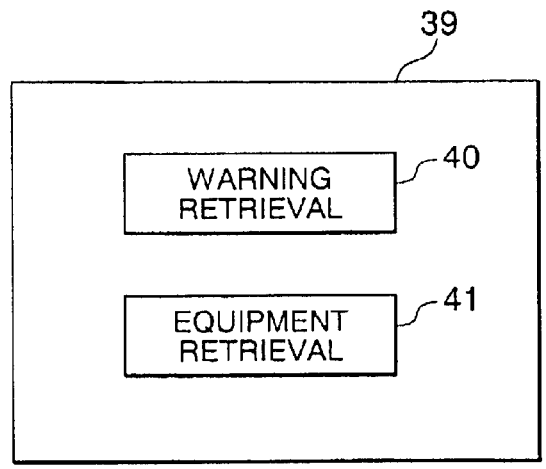
FIG. 29 is an initial input screen according to the seventh embodiment of the present invention.

Moreover, the basic operation of this seventh embodiment is similar to that of the first embodiment, but differs therefrom in an input screen for the equipment of interest which becomes the base point of extraction. The initial input screen is as shown in FIG. 29. This input screen 39 is formed in such a manner as to allow selection between a warning retrieval button 40 and an equipment retrieval button 41. When an equipment retrieval command is input, the display management part 6 displays an input screen as in the case of the fourth embodiment 4. By manually inputting necessary information on the input screen, processing similar to that of the fourth embodiment will be carried out. When the input is a warning retrieval command, processing is first passed to the warning input part 37. The processing in the warning input part 37 is the same as that in the sixth embodiment. However, in the case where warning viewpoint conversion information is used, added to the processing flow of the warning input part as shown in FIG. 24 is a new step where a viewpoint k corresponding to a warning w is determined from warning viewpoint information in which warning viewpoints are set beforehand. The following processing is the same as in the sixth embodiment.

The flow chart of the processing of the monitored equipment extraction part 5 is common to that of the sixth embodiment except for steps ST1 and ST6. In step ST1, a piece of equipment of interest, which becomes the base point of extraction, and its attribute are set, as already explained before. The step ST6 is the same as in the fourth embodiment. That is, viewpoint-specific weight coefficients are taken into consideration in the setting of weight values. The difference of this embodiment from the fourth embodiment is that a viewpoint corresponding to the warning w is reflected on the viewpoint-specific weight coefficients.

Although in this embodiment, the warning equipment conversion information and the warning viewpoint conversion information are separately set, one piece of "warning conversion information" describing an equipment ID, an attribute name and a viewpoint may be set for one warning. In this case, one retrieval may be satisfactory to find a warning of concern from among the data as compared with two retrievals required when the two kinds of information are separately set, thus making it possible to reduce the retrieval time by half. Also, in this case, the configuration of FIG. 27 is modified such that the warning equipment conversion information storage part 36 and the warning viewpoint conversion information storage part 38 are combined into a warning conversion information storage part.

In addition, although the initial input screen 39 shown in FIG. 29 is always first displayed in this example, it may be constructed such that the same processing as that performed when the warning retrieval button 40 is pressed is automatically started upon generation of a warning. In this case, when a warning is generated, information relating to the warning can be displayed soon without directing at all what should be first retrieved. Accordingly, the user or operator can check the matters to be subsequently confirmed and make necessary arrangements more quickly.

Thus, according to the seventh embodiment, for the purpose of designating a piece of equipment of interest, provision is made for a means for designating or specifying the equipment of interest automatically referring to the latest warning and a means for allowing a user to designate or specify an arbitrary piece of equipment, whereby a set of pieces of equipment related to the equipment of interest can be effectively selected according to a situation. For instance, upon generation of a warning, the related equipment information set is first displayed automatically and hence promptly, and arbitrary pieces of equipment can then be designated or specified one by one so as to present appropriate information. As a result, information can be presented according to the progress of user's grasping the situation. Moreover, related viewpoints can be automatically extracted and set depending upon the warning, so that it is possible to obtain quickly and accurately narrowed information about the warning. Consequently, it becomes easier to use a display device of a small screen even in case of an emergency such as an abnormal situation.

Embodiment 8.

Figure 30:
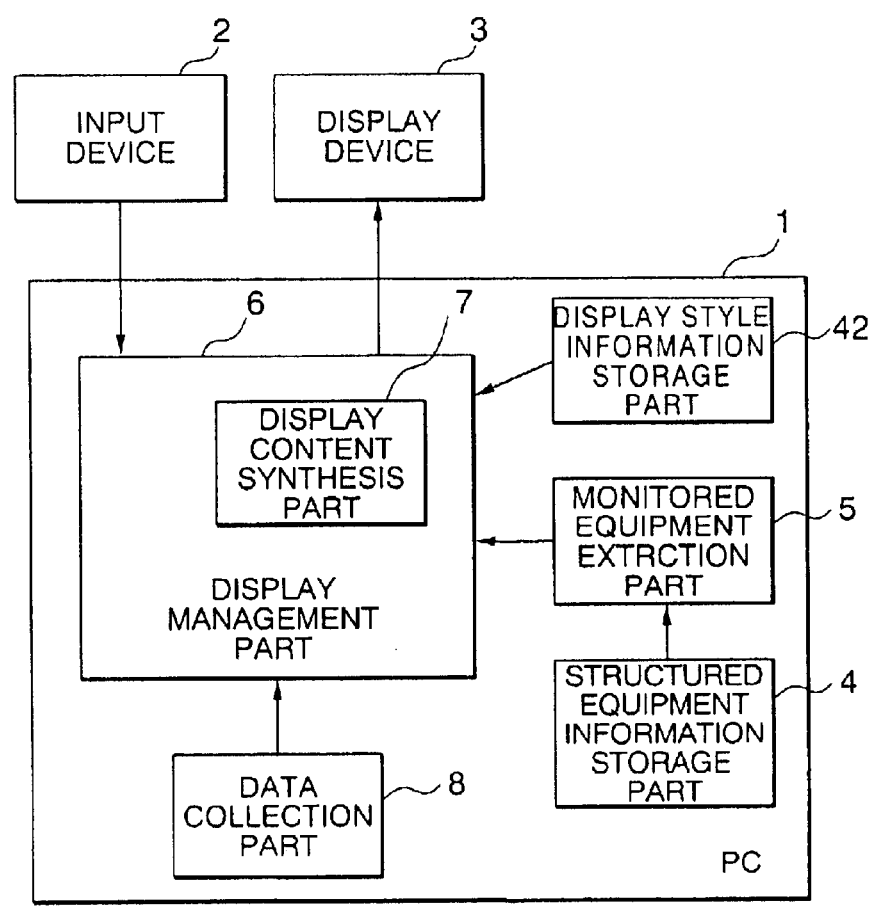
FIG. 30 is a configuration block diagram of a monitoring system according to an eighth embodiment of the present invention.
Figure 32:
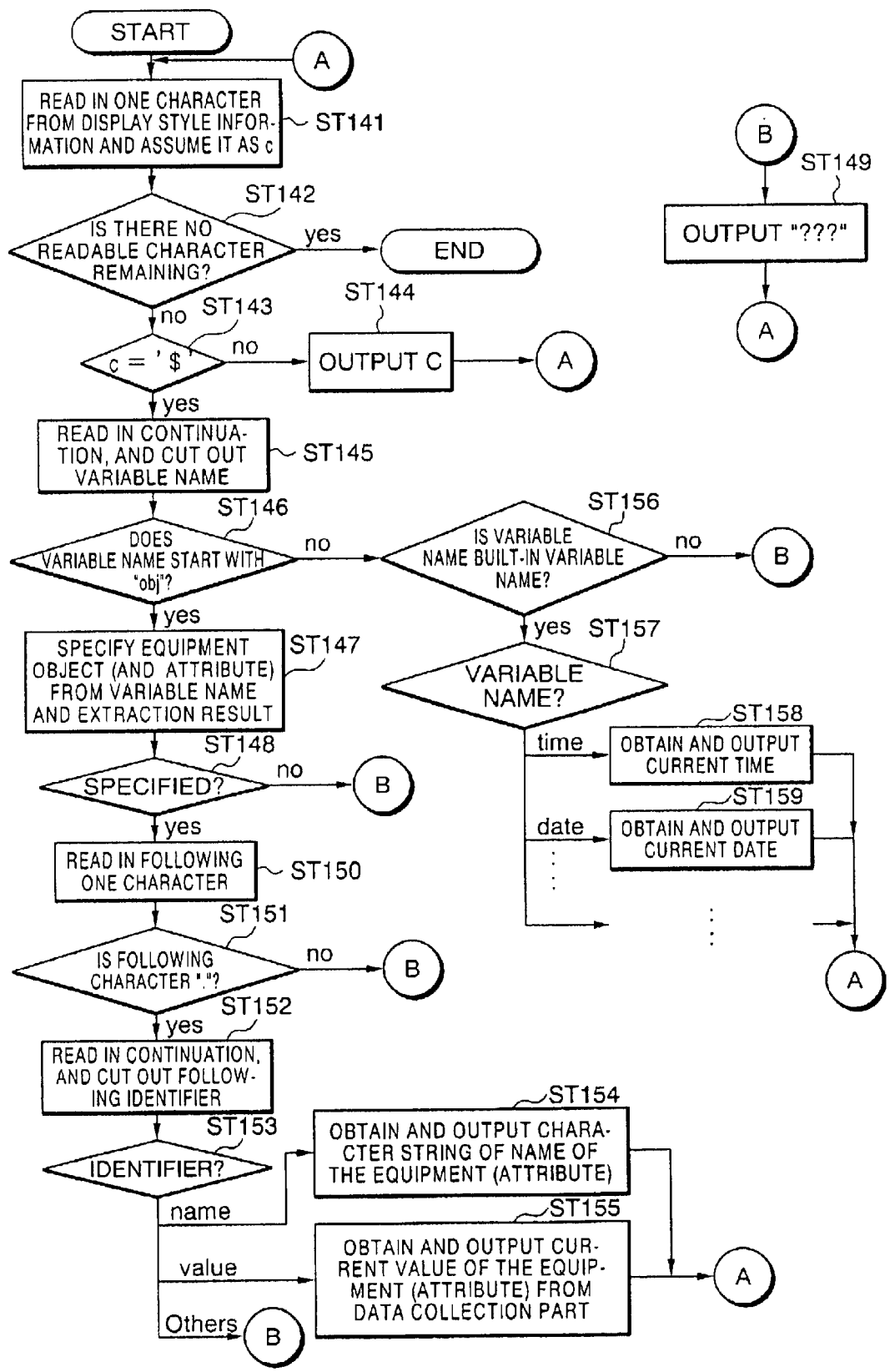
FIG. 32 is an example of a flow chart showing the synthetic processing of display contents by using the display style information.

Although in the above-mentioned first through seventh embodiments, the extraction of those pieces of equipment which are to be displayed is changed from a fixed to a flexible one so as to meet a situation, an eighth embodiment of the present invention serves to increase the freedom of how to arrange a display in cases where those pieces of equipment which are to be displayed are already determined for example. To this end, display style information as illustrated in FIG. 31 is set. In this example, the display style information is in the form of a plain text with a variable starting with "$" being embedded therein. In FIG. 31, a character string "$time" on the second line is a variable for displaying the current time when outputting information for instance. Similarly, another character string "$obj1.name" on the third line is a variable for displaying the equipment name (and attribute name) of the first one among extracted equipment objects (their attributes). Such a method of definition is one example, and other script languages or the like for instance may be acceptable. Also, scripts such as ASP (Application Server Pages) and JSP (Java (registered trademark) Server Pages) are acceptable. FIG. 30 is a block diagram of the configuration of a monitoring system according to this eighth embodiment, where a display style information storage part 42 for storing display style information is added to the configuration of FIG. 1. Here, note that the difference of this embodiment from the above-mentioned first through seventh embodiments is only the contents of display content synthetic processing. Thus, a flow chart of the processing of the display content synthesis part 7 will be described below according to FIG. 32 while taking FIG. 33 as an example. In FIG. 32, first in step ST141, one character is read in from the display style information part 42, and the character thus read is assumed to be "c". Then in step ST142, it is checked whether "c" was able to be read in. If not, the processing is ended. On the other hand, if "c" was able to be read in step ST142, the flow advances to step ST143, where it is examined whether "c" is a character "$". If not, the flow advances to step ST144, where "c" is output and a return to step ST141 is carried out. If, however, "c" is "$" in step ST143, the flow advances to step ST145. In step ST145, the continuation of "c" is read from the display style information 42. When reading is continued until a period ".", a space character, or a line feed character, or a tab character comes out, the name of the variable (i.e., the characters before ".", a space, a line feed, or a tab) is cut out.

Subsequently in step ST146, it is examined whether the variable name starts with "obj". If it starts with "obj", the flow advances to step ST147, where the ordinal number or position of an equipment object having that variable name among the equipment objects extracted by the monitored equipment extraction part 5 is determined from the variable name, and then the equipment object of that variable name is specified. In step ST148, it is examined whether the equipment object of that variable name was specified. If not, that is, if the number of the extracted equipment objects is less than that of the designated variable, the flow advances to step ST149 where "???" is output, and then a return to step ST141 is carried out. If, however, it was able to be specified in step ST148, the following character is then read in step ST150.

Subsequently, in step ST151, it is examined whether the character thus read is ".". If not, the flow advances to step ST149, whereas if the character read in is "." in step ST151, then in step ST152, the continuation of "." is further read in until a space character or a line feed character comes out (i.e., immediately before such a character), and the characters thus read in are assumed to be an identifier. Thereafter, in step ST153, the identifier thus read in is examined. If the identifier is "name", the flow advances to step ST154 where a character string of the name of the equipment object (and its attribute) is obtained and output, and then a return to step ST141 is performed. If the identifier is "value" in step ST153, the flow advances to step ST155 where the current value of the equipment object (and its attribute) is obtained from the data collection part 8 and the value thus obtained is output, and then a return to step ST141 is carried. In addition, step ST153 is branched to node "B" in, case of "Others" are selected. On the other hand, if the variable name does not start with "obj" as a result of step ST146, then in step ST 156, it is examined whether the variable name is the name of another built-in variable.

If it is not the name of any prescribed built-in variable, the flow advances to step ST149, whereas if it is the name of a prescribed built-in variable (for example, "time" or "date" in this flow chart), the flow advances to step ST157 where the variable name is examined. As a result, if it is "time", the flow advances to step ST158 where the current time is obtained and its value is output. Then, a return is performed to step ST141. If the variable name is "date" in step ST157, the flow advances to step ST159 where the current date is obtained and its value is output. Thereafter, a return is carried out to step ST141. In addition, if there is another built-in variable, it is similarly converted into a corresponding character string which is then output. After that, a return to step ST141 is carried out. Finally, there remains no character to be read in step ST142, and the entire processing is ended. FIG. 33 is an example of an output of the display content synthesis part 7 according this embodiment. In this case, the output is displayed on the display device 6 in the same manner as shown in FIG. 33.

Thus, according to this embodiment, it is possible to arrange a display with its display style being not fixed but flexible or variable in a form described in display style information. In particular, in cases where criteria for extracting a, set of pieces of related equipment information greatly differ from plant to plant, it is desirable to accordingly change their display style. Therefore, by combining this embodiment with any of the above-mentioned various embodiments, it is possible not only to freely extract and output those pieces of equipment which are closely related to a certain piece of equipment in accordance with a situation, but also to prepare definition information (e.g., a file) on a display style suitable for each plant through the display style defined in the display style information, instead of providing it as a program. As a result, the output can be easily customized according to each customer at low cost.
Embodiment 9.

In a ninth embodiment of the present invention, a set of pieces of related equipment information are extracted beforehand for each of a plurality of pieces of equipment of interest, and used online with their display style unchanged or slightly modified. FIGS. 34(*a*) and 34(*b*) are block diagrams of the separate configurations, respectively, of a monitoring system according to this ninth embodiment. FIG. 34(*a*) illustrates the configuration of the monitoring system required in the case where a display style is beforehand prepared offline. Also, FIG. 34(*b*) illustrates the configuration of the monitoring system in the case where a related equipment information set together with actual monitor data is output online with the display style prepared offline being followed. FIGS. 34(*a*) and 34(*b*) are illustrated from a standpoint that online processing and offline processing are carried out independently of each other by separate PCs, respectively, but it is not necessarily required to perform these processing by the use of separate computers. Thus, there is thought a method in which a PC including both configurations of FIGS. 34(*a*) and 34(*b*) is employed with its configurations or functions being used case by case.

In this embodiment, when the system is offline, the extraction processing is performed by the monitored equipment extraction part 5 while the display management part 6 is managing an input from the input device 2 and a display content to the display device 3. The monitored equipment extraction part 5 extracts a related equipment information set from structured equipment information through processing similar to what has been thus far explained, and preserves it in a static display information storage part 43 as static display information. The offline functions of the system are performed by a PCa 1 for example.

On the other hand, when the system is online, a PCb 44 is provided with a static display information storage part 49 which stores the static display information which is the related equipment information set extracted by the PCa 1. In addition, the PCb 44 is provided with a display management part 47 which includes and manages a display content synthesis part 50 for synthesizing a display content to a display device 46 by using the static display information and data from a data collection part 48.

In FIGS. 34(a) and 34(b), the structured equipment information storage part 4, the structured equipment information stored therein, the monitored equipment extraction part 5, and the data collection part 48 have the same contents or functions as those of the components of the same names of the first embodiment. Of the entire configuration of this monitoring system corresponding to the configurations of FIGS. 34(a) and 34(b), the overall configuration thereof when it is offline is similar to the configuration of FIG. 2 of the first embodiment, whereas the overall configuration of the system when it is online is similar to the configuration of FIG. 14 of the second embodiment. Here, note that though the explanation of FIGS. 34(a) and 34(b) has been made on the assumption that separate PCs are used for the online operation and the offline operation, respectively, the online and offline functions may be carried out by one and the same PC. That is, the PCa 1 and the PCb 44 may comprise one and the same computer. However, the input device and the output device during an online mode are assumed to be a keyboard and a CRT, respectively, as shown in FIG. 2, whereas the input device and the output device during an offline mode are assumed to be a PDA, as shown in FIG. 14.

FIG. 35 is an example of static display information. This describes a display style for passing a plain text to the display content synthesis part 50. For instance, there is a description "$eq001.attr01" on the second line in this Figure. This means that the equipment ID is the first one and the attribute is also the first one. FIG. 36 is a display information definition table for managing respective pieces of static display information. In this display information definition table, there are stored group numbers, group names, and reference information for referring to display information of each group. For instance, in this Figure, the group name of group number 1 is "○ △ equipment", and its display information is a reference to the same thing as illustrated in FIG. 35. In this example, the display information definition table, though not clearly shown in FIG. 34(a), is stored in the static display information storage parts 43, 49 together with the static display information at the time of online and offline modes. The user input screen during the offline operation is almost the same as the input screen 24 in FIG. 12 excepting that the display button 27 is replaced by an extraction button.

Figure 37:
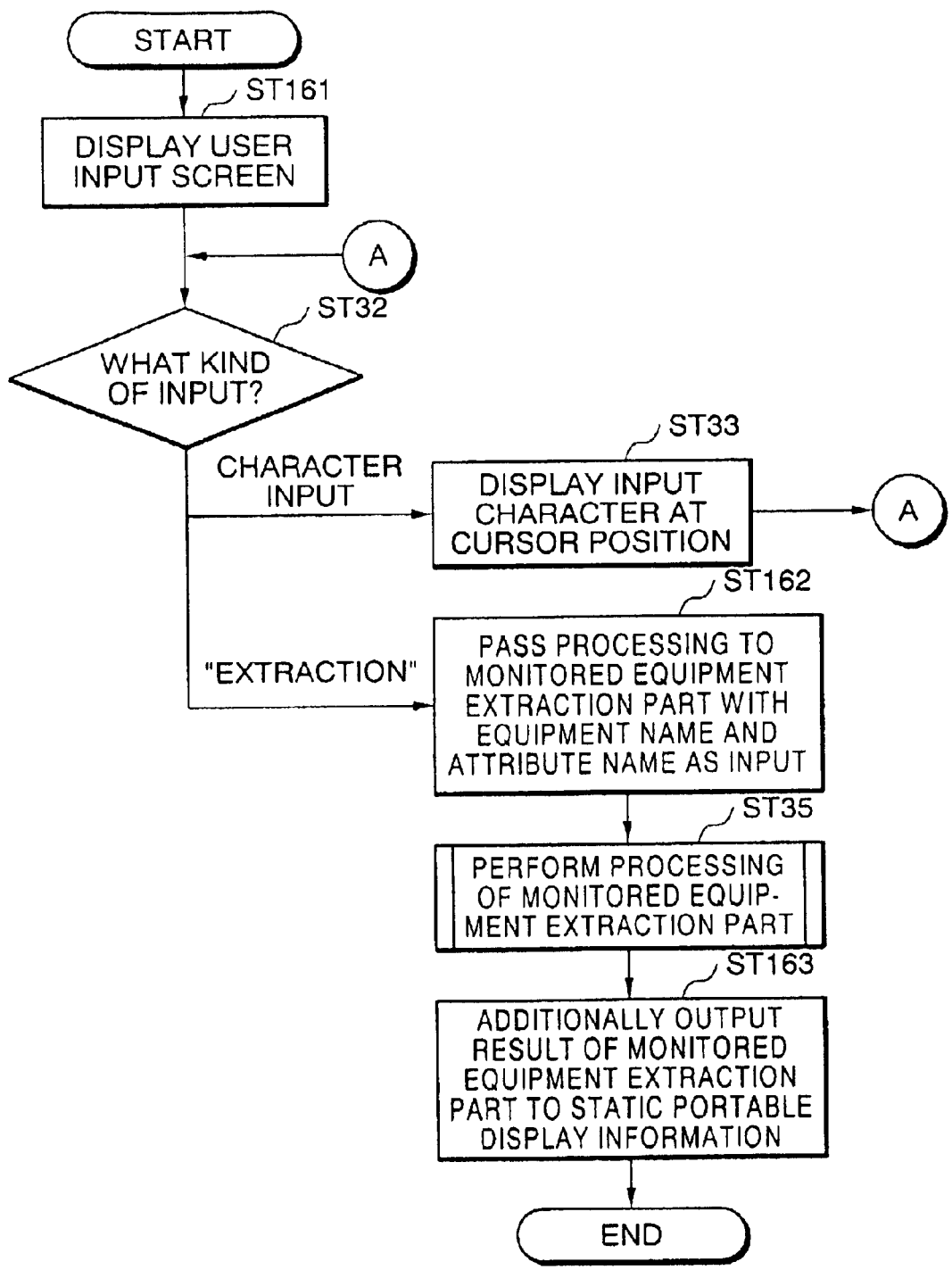
FIG. 37 is a flow chart of the processing of a display management part according to the ninth embodiment of the present invention when it is offline.

FIG. 37 is a flow chart of the processing of the display management part 6 when the system is offline. First of all, in step ST161, the user input screen (similar to FIG. 12) is displayed, and in step ST32, a user's input is waited for. In step ST33, if there is an input, the input is displayed on a screen according to the kind of the input information. That is, if there is a character input, the input character is displayed at the position of a cursor on the screen, and then a return is carried out to step ST32. If the input is an extraction command as a result of the step ST32, then in step ST162, processing is passed to the monitored equipment extraction part 5 with those which are input to the equipment name input area 25 and the attribute name input area 26 on the user input screen (similar to FIG. 12) being as inputs. In addition, in step ST163, the static display information as shown in FIG. 35 is created by using the extraction result of the monitored equipment extraction part 5, and it is additionally registered in the display information definition table as shown in FIG. 36. At this time, a screen for inputting a group name is displayed, and the group name to be input may be made the one for registration. A method of creating static display information is basically the same as that shown in FIG. 10 of the first embodiment. However, in step ST25 in FIG. 10, the current value of a piece of equipment is not output, but instead the equipment ID of the equipment and, if an attribute is designated, the attribute after the ordinal number thereof having been examined are output in the form of "eq000.attr00".

In the processing of FIG. 37, an output style is predetermined by a program so that an output is carried out in the predetermined style. However, a style definition file such as display style information or the like may be used so that an output is performed in a style defined in that file, as in the eighth embodiment. In this case, similar to the eighth embodiment, it becomes possible to define the output style corresponding to a customer or the like more flexibly.

Figure 38:
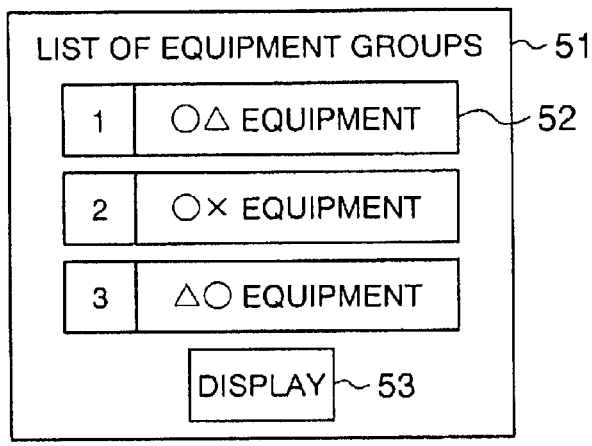
FIG. 38 is an example of a group selection screen according to the ninth embodiment of the present invention when it is online.

FIG. 38 shows a group selection screen 51 during the system is online. This screen is created by reading in a display information definition table. For instance, when the first line 52 is focused and selected, this line (i.e., 1 and ○ △ equipment) is highlighted. When a display button 53 is then selected, a display command is issued.

Figure 39:
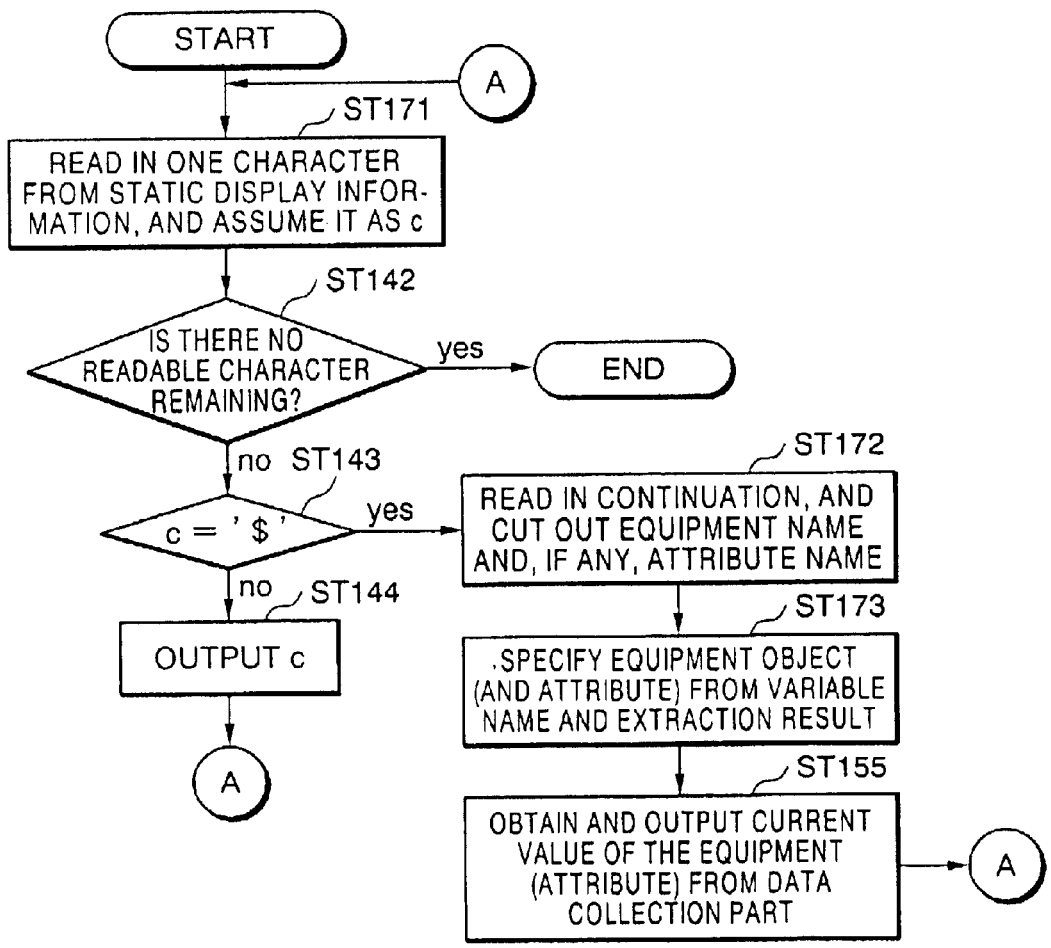
FIG. 39 is a flow chart of the processing of a display content synthesis part according to the ninth embodiment of the present invention.

FIG. 39 is a flow chart of the processing of the display content synthesis part 50. (FIG. 32 is simplified to show different points.) First, in step ST171, one character is read in from the static display information as shown in FIG. 35, and the character is assumed to be "c". Then, it is examined whether "c" was able to be read in step ST142. If it was not able to be read, the processing ends, whereas if it was able to be read in step ST142, it is examined in step ST143 whether "c" is a character "$". As a result, if it is not "$", "c" is output in step ST144, and a return to step ST171 is carried out. On the other hand, if "c" is the character "$" in step ST143, the continuation of "c" is read in step ST172. That is, the portion following "c" is read in until ".", a space character, or a line feed character comes out, and the portion thus read in is assumed to be an equipment name. If the last one read in is ".", reading is further continued. The reading is continuously carried out until a space character or a line feed character comes out, and the character string thus read in is assumed to be an attribute name. An equipment name and an attribute name have the forms of "eq000" and "attr00" ("0" is a numerical number), respectively. Subsequently, in step ST173, an equipment ID is first determined from the equipment name and the attribute name cut out in step ST172, and a corresponding equipment object is specified. Also, the attribute of the equipment object is specified from the attribute name. Then, in step ST155, the current value of the equipment (its attribute) is obtained from the data collection part 48, and the value thus obtained is output. Thereafter, a return is performed to step ST171.

Figure 40:
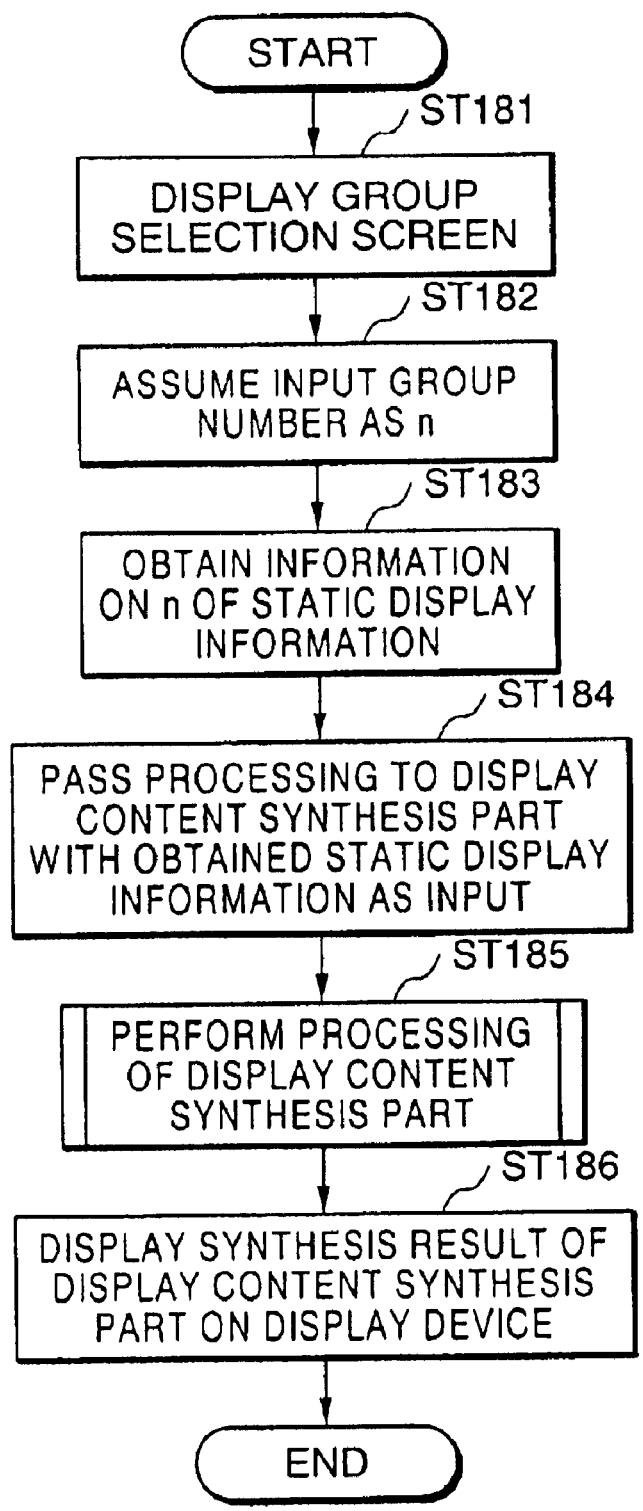
FIG. 40 is a flow chart of the processing of the display management part according to the ninth embodiment of the present invention when it is online.

FIG. 40 is a flow chart of the processing of the display management part 47 when the system is online. First, in step ST181, the equipment group selection screen 51 of FIG. 38 is displayed, and then a user selects a group and presses a display command. Thereafter, the flow advances to step ST182 where the group number of the group selected by the user is assumed to be "n". Subsequently, in step ST183, an nth piece of static display information is obtained from the static display information definition table of FIG. 36. Then, in step ST184, processing is passed to the display content synthesis part 50 with the static display information obtained in step ST183 being as an input. After the process of, the display information content synthesis part (in step ST185), in step ST186, the synthetic result of the display content synthesis part 50 is passed to the display device 46 where it is displayed.

Thus, according to this ninth embodiment, the monitored equipment extraction part extracts in advance a set of pieces of equipment closely related to the equipment of interest by using weight coefficient storage information and structured equipment information, and defines the content of an output based thereon. In this case, the monitored equipment extraction part can prepare the output content based on the thus extracted related equipment set, by using it as it is, or by processing it in an appropriate manner. Accordingly, the amount of labor for defining the output content during an online mode can be reduced.

An offline monitoring system is usually installed in factories or the like of manufacturers, and in particular, it is used, as a system for constructing a monitoring system, to prepare a static display information definition table used in an online monitoring system, as introduced in this ninth embodiment. Thus, it is possible to omit the extraction processing on the online monitoring system side, thereby reducing the required load of a computer to a considerably extent. In addition, as described in the ninth embodiment, it may be constructed such that the extraction processing is not completely performed on the online monitoring system side, but frequently used graphical contents are stored as disply information in advance, so that the extraction processing is carried out only in those cases which can not be dealt with by the graphical contents stored beforehand. With such an arrangement, the online monitoring system requires a monitored equipment extraction part, a structured equipment information storage part, etc., but in this case, the load of the computers can be greatly reduced as compared with the case in which all the extraction processing is carried out by the computers. In addition, it is possible to use a single computer so as to perform the functions of the above parts case by case.

Embodiment 10.

Figure 41:
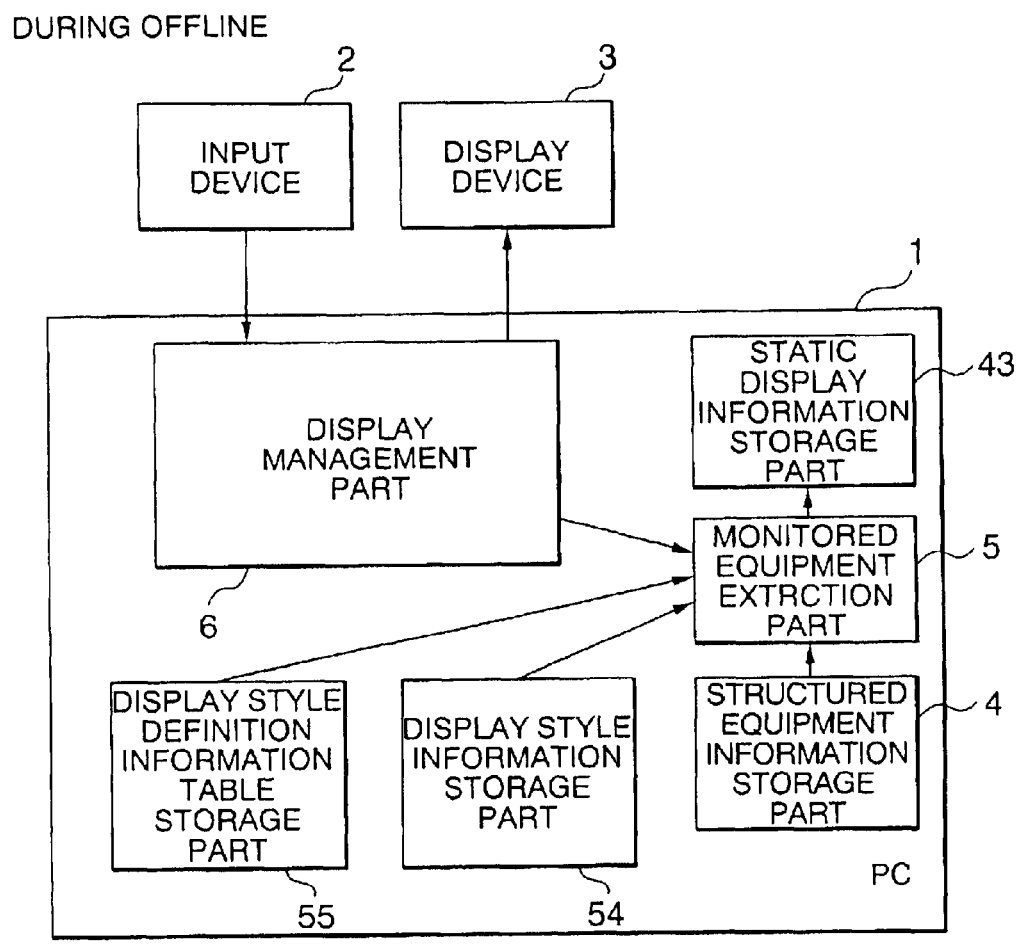
FIG. 41 is a configuration block diagram of a monitoring system according to a tenth embodiment of the present invention when it is offline.

FIG. 41 shows a block diagram of the configuration of a monitoring system according to a tenth embodiment of the present invention when it is offline. This is basically the same as that of FIG. 34(*a*) of the ninth embodiment, but differs therefrom in that a display style information storage part 54 for storing display style information is added. The configuration of this embodiment when the system is online is the same as that of FIG. 34(*b*) of the ninth embodiment. The display style information comprises screen definition data conventionally used when screens of the monitoring system are prepared. The display style information is the data which defines how to draw what kinds of figures at which positions on the screen, how to display as character strings which data obtained from the data collection part at which positions, or how to describe which figures in what colors according to which data.

The display management part 6 passes processing to the monitored equipment extraction part 5 according to an input thereto while processing the input from the input device 2 and the display to the display device 3. The monitored equipment extraction part 5 carries out extraction processing based on the structured equipment information and the display style information, and outputs static display information, as in the ninth embodiment. Also, the display management part 6 is provided with a table of display style information as a display style definition table 55. The display style definition table 55 stores correspondence between style numbers (or style IDs) and the display style information stored in the display style information storage part 54.

In FIG. 41, the structured equipment information in the structured equipment information storage part 4, the input device 2, the display device 3, and the static display information stored in the static display information storage part 43 are the same as those of the ninth embodiment when the system is offline.

Figure 42:
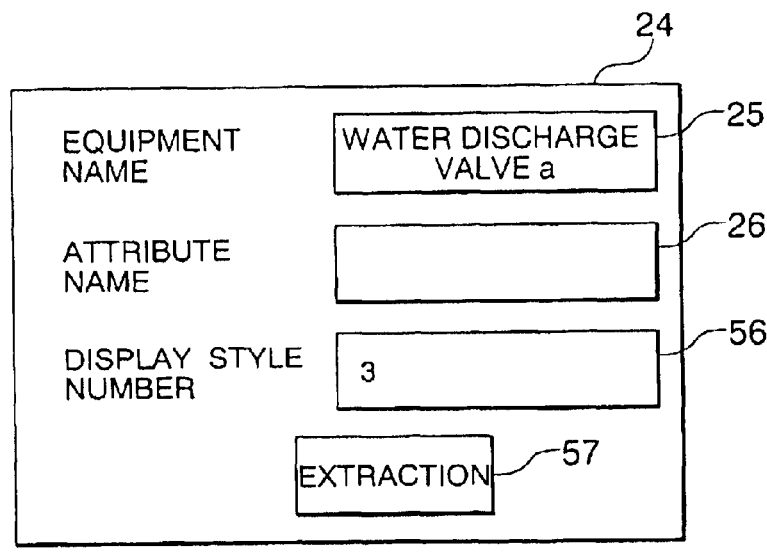
FIG. 42 is an example of a user input screen according to the tenth embodiment of the present invention.

FIG. 42 is a user input screen 24 according to this embodiment. The user input screen 24 is provided with an equipment name input area 25, an attribute name input area 26, a display style number input area 56, and an extraction button 57. The flow chart of the processing of the display management part 6 is basically the same as the flow chart of FIG. 37 of the ninth embodiment, but the processing in step ST162 is replaced by the processing in which processing is passed to the monitored equipment extraction part 5 with the equipment name, the attribute name and the display style number being as inputs.

The flow chart of the processing of the monitored equipment extraction part 5 is based on that of FIG. 7 of the first embodiment, but it differs therefrom in that the following two steps ST200 and ST201 are inserted in this order between step ST14 and step ST15. That is, in step ST200, a display style number is read in from an input, and display style information is specified and read in. In step ST201, those pieces of equipment in the related equipment table which are not included in the display style information are removed. That is, when no relation object remains any more as a result of step ST4, if cnt=0 (step ST14), then the processing in step ST200 (i.e., a display style information number is read in from the display style number input area, and the display style information is specified and read in from the display style definition table.) and the processing in the following step ST201 (i.e., those pieces of equipment (and their attributes) in the related equipment table which are not included in the display style information read in step ST200 are removed) are performed, after which the flow proceeds to step ST15 where final equipment extraction is carried out.

Thus, according to the tenth embodiment, the monitored equipment extraction part is able to extract in advance only those pieces of equipment closely related to a certain piece of equipment which are defined in a certain piece of display style information, and thereafter present appropriate information based on the result of the extraction.

Accordingly, it is possible to prepare appropriate information by extracting in advance pieces of equipment closely related to a certain piece of equipment from those pieces of equipment which are defined in a certain piece of display style information, and by applying the extracted pieces of equipment to the definition of an output content without any change or modification thereof, or processing them in an appropriate manner. Thus, the amount of labor for defining the output content beforehand is reduced to a practical extent.

Embodiment 11.

Figure 43:
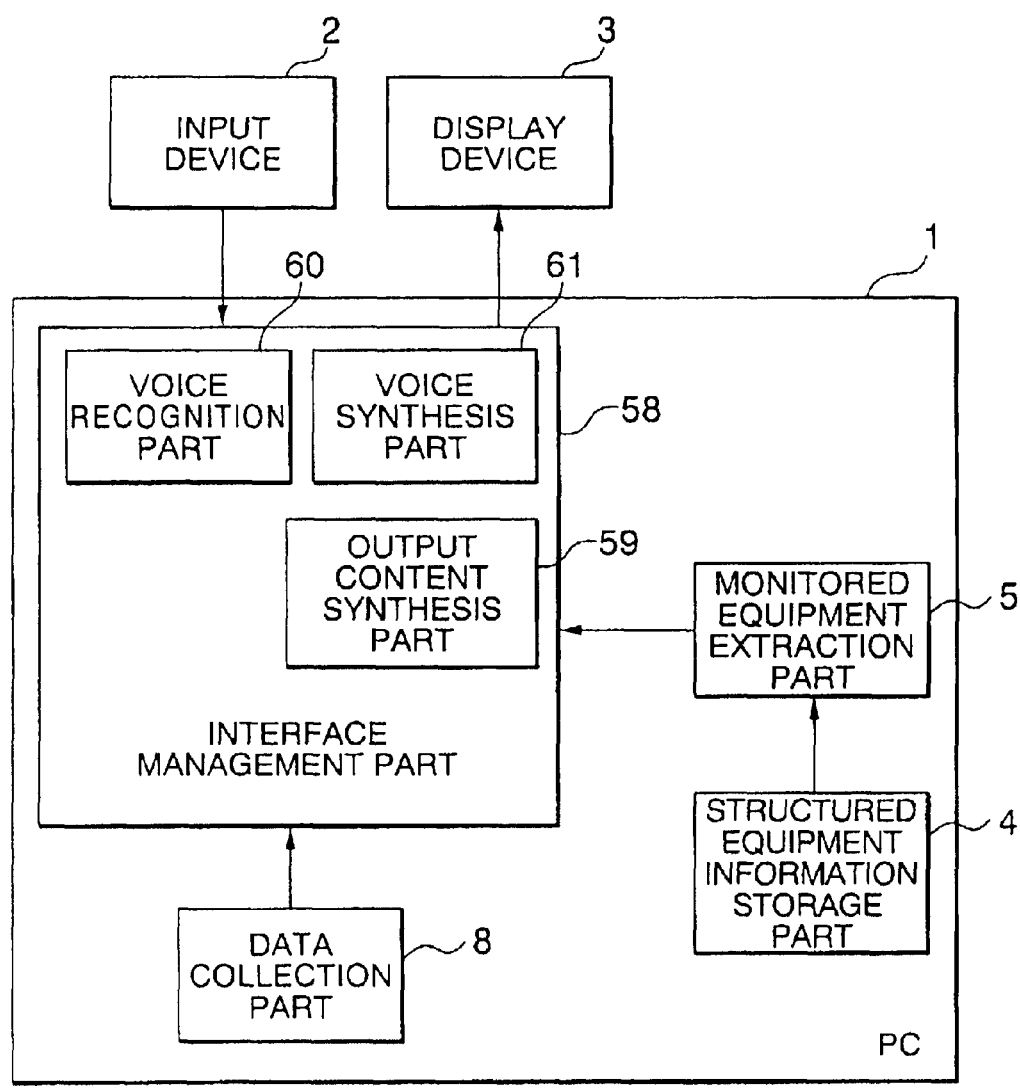
FIG. 43 is a configuration block diagram of a monitoring system according to the eleventh embodiment of the present invention.

FIG. 43 is a block diagram of the configuration of a monitoring system according to an eleventh embodiment of the present invention. This embodiment is basically common to the configuration of FIG. 1 of the first embodiment, but differs therefrom in the following features. That is, this embodiment is provided with an interface management part 58 and an output content synthesis part 59 in place of the display management part 6 and the first data processing device, respectively. Also, a voice or speech recognition part 60 and a voice or speech synthesis part 61 are added to the interface management part 58. Note that the voice recognition part 60 and the voice synthesis part 61 are the same as those already broadly used in general. The voice recognition part 60 serves to convert a voice or audio signal input into a corresponding character string. The voice synthesis part 61 serves to convert an input of the character string from the interface management part 58 into a corresponding voice or audio output signal. An audio input signal is input from the input device 2 to the voice recognition part 60, and an audio output signal is output from the voice synthesis part 61 to the output device 3. Here, note that separate use of the display content synthesis part and the output content synthesis part is not essential, so anyway these components parts are common in their function of generating an output. Since the voice is handled in this eleventh embodiment, the term "output" is used instead of "display".

Figure 44:
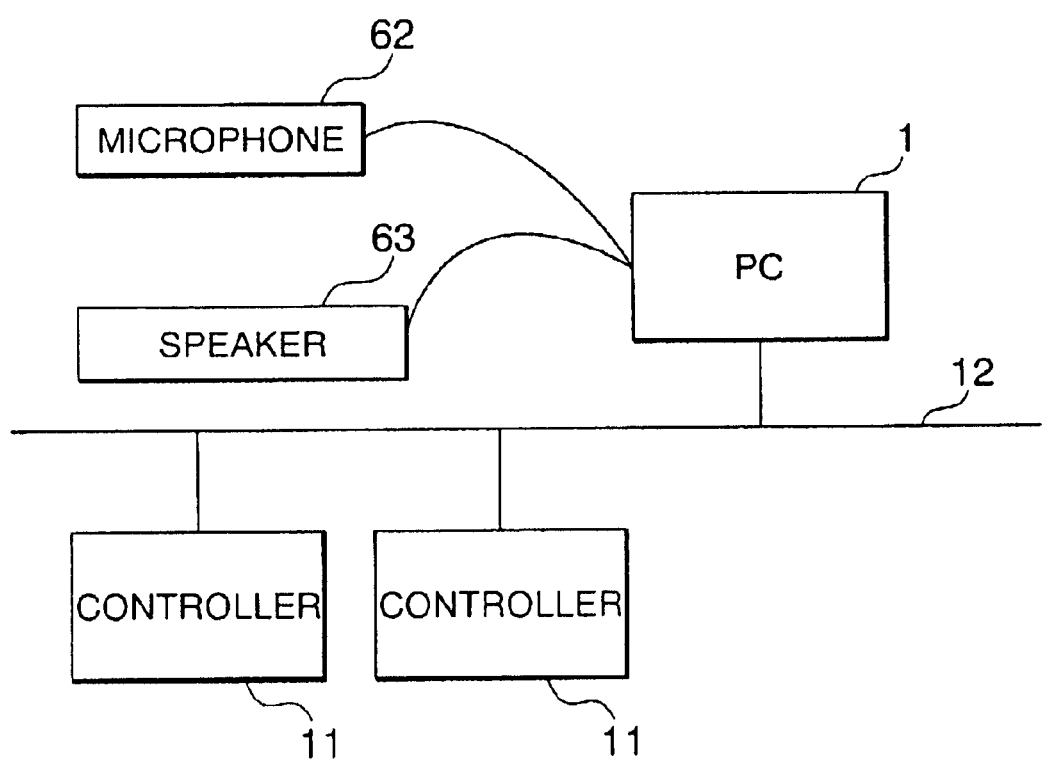
FIG. 44 is a third example of the entire configuration of a monitoring system according to an eleventh embodiment of the present invention when it is actually operated.

FIG. 44 is a block diagram of the entire configuration of this embodiment. The PC 1 is provided with a microphone 62 which acts as the input device 2, and a speaker 63 which acts as the output device 3. The components of this embodiment other than these are similar to those of FIG. 2 of the first embodiment.

Figure 45:
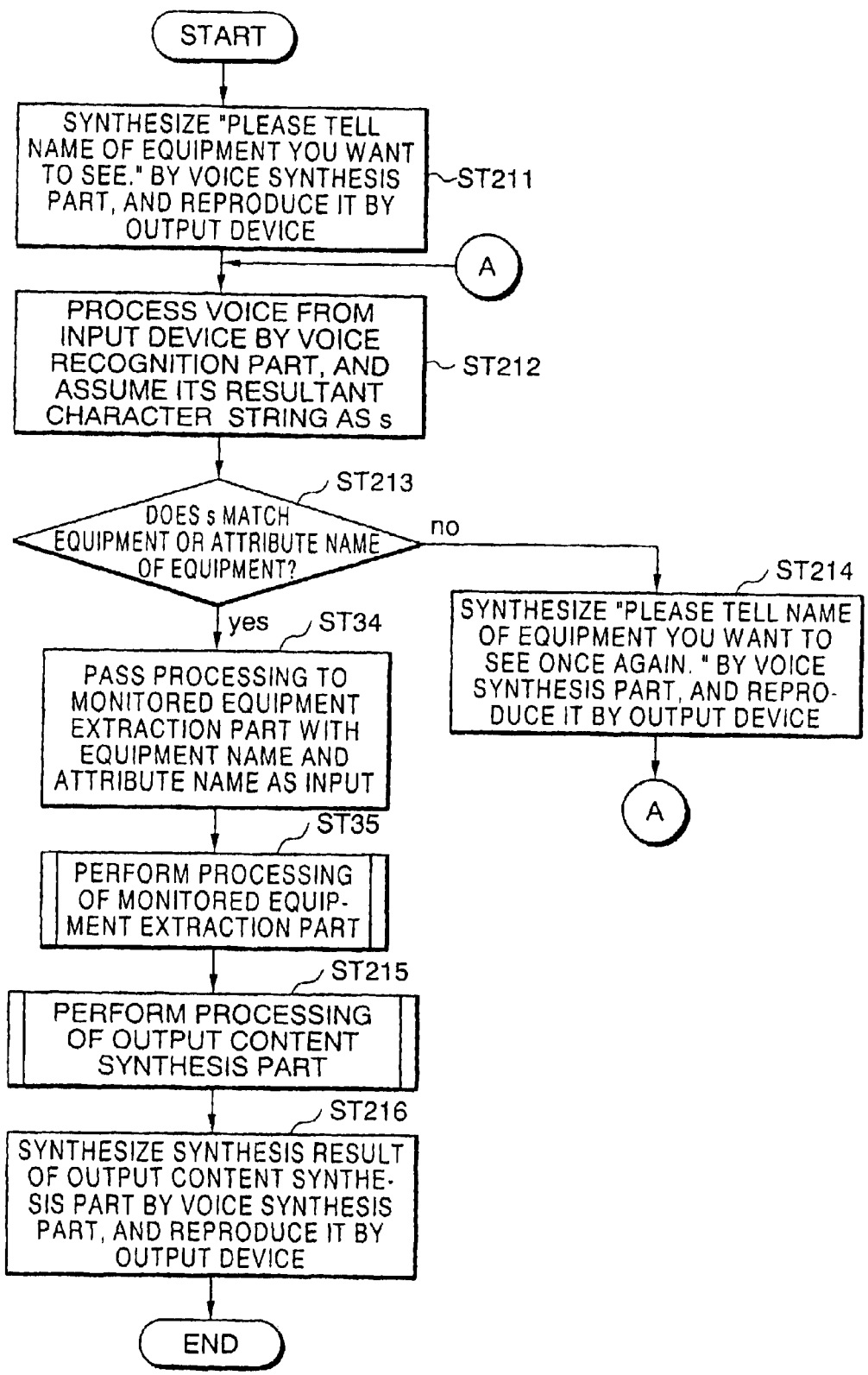
FIG. 45 is a flow chart of the processing of an interface management part according to the eleventh embodiment of the present invention.

FIG. 45 is a flow chart of the processing of the interface management part 58. First of all, in step ST211, a character string "Please tell the name of a piece of equipment which you want to see." is passed to the voice synthesis part 61 where a voice corresponding to this string is synthesized. The result of the voice synthesis part 61 is sent to and reproduced by the output device 3. Subsequently, in step ST212, the audio signal from the input device 2 is processed by the voice recognition part 60, and a resultant character string is assumed to be "s". In step ST213, it is examined whether "s" matches an equipment name or an attribute name of a piece of equipment to be monitored. If not, the flow advances to step ST214 where a character string "Please tell the name of a piece of equipment which you want to see again." is constructed by the voice synthesis part 61. The audio signal thus output is reproduced by the output device 3, and then the flow returns to step ST212. On the other hand, if there is a match in step ST213, then in steps ST34 and ST35, processing is passed to the monitored equipment extraction part 5 with the resultant equipment name (and attribute name) obtained in step ST213 being as an input. Subsequently, in step ST215, processing is passed to the output content synthesis part 59 with the extraction result of the monitored equipment extraction part 5 being as an input. Then in step ST216, a character string, which is the synthetic result of the output content synthesis part 59, is passed to the voice synthesis part 61 where it is subjected to voice synthesis processing. A resultant audio signal thus synthesized by the voice synthesis part 61 is sent to and reproduced by the output device 3.

The processing of the output content synthesis part 59 is substantially the same as that of the display content synthesis part 7 of the first embodiment. Also, the structured equipment information, the monitored equipment extraction part 5 and the data collection part 8 are the same as those of the first embodiment.

Thus, according to the eleventh embodiment, the monitored equipment extraction part 5 is able to extract those pieces of equipment which are closely related to a certain piece of equipment by using structured equipment information, and carry out input and output operations through the voice input device and the voice output device. Since it takes much time to output voices or audio data, it is desired that the voice input/output interface outputs a smallest possible amount of necessary and appropriate data. According to the present invention, however, information for that purpose can be appropriately provided by the extraction processing of the extraction part.

Although in the eleventh embodiment, inputs and outputs are performed through the use of voice, inputs may be carried out by other methods, and outputs alone may be carried out through voice. Even if doing so, it is possible to make full use of the effect of the present invention, that is, the capability of effectively extracting and preparing a necessary and appropriate amount of output.

As described in the foregoing, the present invention provides a variety of unique and useful advantages which will be described below.

According to one aspect of the present invention, there is provided a monitoring system including: an output device which presents monitor data to an operator; and a data processing device which has a data collection part for collecting the monitor data, processes the data collected by the monitor data collection part, and passes the data thus processed to the output device as an output content. The data processing device includes: a structured equipment information storage part for storing structured equipment information which includes equipment information on a plurality of pieces of equipment and relational information describing relations among the plurality of pieces of equipment; and a monitored equipment extraction part which roughly extracts, from structured equipment information stored in the structured equipment information storage part, equipment information and relational information on those pieces of equipment which have a prescribed relation to a piece of equipment of interest having a designation of attributes with the equipment of interest having the designation of attributes being set as a base point for extraction. The monitored equipment extraction part calculates a weight value for each of the roughly extracted pieces of equipment from equipment information and relational information on the roughly extracted pieces of equipment, and finally extracts pieces of equipment information as a related equipment information set based on the weight values. With this arrangement, it is possible to extract those pieces of equipment which are closely related to a piece of equipment of interest in an appropriate manner, whereby a narrowed or reduced number of pieces of related equipment can be output. In addition, it becomes unnecessary to prepare in advance a lot of graphical contents, which could be conceived from a relation to the equipment of interest, as fixed graphical contents. As a result, by designating and selecting a certain relation with respect to a piece of equipment according to a situation, it is possible to extract and output only a small number of pieces of related equipment which have the designated and selected relation with respect to that piece of equipment as occasion arises. Thus, it becomes easy to deal with the matters by the use of a display device of a small screen.

In a preferred form of the present invention, the data processing device includes a weight coefficient information storage part which stores weight coefficient information comprising weight coefficients defined according to the kinds of relations among the pieces of equipment. The data processing device specifies the kinds of relations for the roughly extracted pieces of equipment based on the relational information, and regards, as weight values, the values which are obtained by adding weight coefficients, which are obtained from the kinds of relations and the weight coefficient information stored in the weight coefficient information storage part. Thus, it becomes possible to extract those pieces of equipment which are closely related to a certain piece of equipment based on comprehensive or total importance in consideration of the degree of importance according to the kind of a relation among various pieces of equipment. As a result, it becomes possible to extract the information which a user wants to learn by narrowing a variety of pieces of information in a more accurate manner. Accordingly, it becomes unnecessary to prepare in advance a lot of graphical contents, which could be conceived from a relation to the equipment of interest, as fixed graphical contents. As a result, by designating and selecting a certain relation with respect to a piece of equipment according to a situation, it is possible to extract and output only a small number of pieces of related equipment which have the designated and selected relation with respect to that piece of equipment as occasion arises. Thus, it becomes easy to deal with the matters by the use of a display device of a small screen.

In another preferred form of the present invention, the weight coefficient information stored in the weight coefficient information storage part comprises viewpoint-specific weight coefficient information defined by the kinds of relations among the roughly extracted pieces of equipment and viewpoints at the time of extraction thereof. Weight coefficients, which are obtained from the viewpoint-specific weight coefficient information by designating a viewpoint of a piece of equipment of interest with the equipment of interest, which includes a designation of attributes and a viewpoint at the time of extraction, being set as a base point of extraction, is regarded to be the weight coefficient obtained from the weight coefficient information. Thus, it becomes possible to extract pieces of equipment related to a certain piece of equipment in comprehensive consideration of the degree of importance in the kind of each relation among various pieces of equipment and of the degree of importance in each viewpoint required at that time, so that the information which a user wants to learn can be extracted more accurately, thus making it possible to display the information on a small screen more effectively.

In a further preferred form of the present invention, the equipment information in the structured equipment information stored in the structured equipment information storage part includes important equipment information indicating whether each piece of equipment is important. The values, which are obtained by adding a weight coefficient corresponding to the important equipment information and set for each of the roughly extracted pieces of equipment to the weight values, are regarded to be the weight values obtained from the weight coefficient information. Thus, it becomes possible to extract pieces of equipment related to a certain piece of equipment by taking account of the importance of each piece of equipment as well as the weight coefficient thereof in consideration of the kind of their relation to the certain equipment and the viewpoint from which a user wants to see under a situation at that time. Accordingly, the information which a user wants to learn can be extracted more accurately, thus making it possible to display the information on a small screen more effectively.

In a still further preferred form of the present invention, the data processing device includes: a warning equipment conversion information storage part storing warning equipment conversion information which defines relations among warning information, and pieces of equipment and their attributes corresponding to the warning information; and a warning input part which specifies a piece of equipment and its attribute relating to a warning based on warning information, which is input from the pieces of equipment based on the information from the monitor data collection part, and the warning equipment conversion information stored in the warning equipment conversion information storage part. The data processing device makes the equipment and its attribute relating to the warning, which have been specified by the warning input part, a base point of extraction. Thus, it is possible to automatically set a piece of equipment which becomes the base point of extraction by referring to the latest warning without user's inputting and designating information on a piece of equipment of interest which becomes the base point for extraction. Thus, those pieces of equipment (and their attributes) which are closely related to the warning can be extracted promptly and accurately, thereby making it possible to obtain necessary information quickly and effectively even in case of a small display.

In a yet further preferred form of the present invention, the data processing device includes: a warning equipment conversion information storage part for storing warning equipment conversion information which is defined by relations among warning names, and pieces of equipment and their attributes corresponding to the warning names, together with viewpoints included therein; and a warning input part for extracting a piece of equipment, its attribute and its viewpoint relating to a warning based on warning information, which is input from the pieces of equipment based on the information from the monitor data collection part, and the warning equipment conversion information stored in the warning equipment conversion information storage part. The data processing device makes the equipment, its attribute and its viewpoint relating to the warning, which have been specified by the warning input part, a base point of extraction. With such an arrangement, upon generation of a warning, a viewpoint associated with the warning can be automatically extracted and set so that information on the warning being narrowed accurately can be obtained promptly. Thus, in case of an emergency such as an abnormal circumstance, too, it becomes easier to use a display device with a small screen.

In a further preferred form of the present invention, the data processing device includes: an output style information storage part for storing output style information defining output styles; and an output content synthesis part for preparing an output content based on a related equipment information set finally extracted by the monitored equipment extraction part, output style information stored in the output style information storage part, and monitor data obtained from the data collection part. With such an arrangement, the styles described in output style information are easily changed, thus making it possible to change an output style in an easy and simple manner according to the flexibility of extraction. Accordingly, a user is able to see the intended output in more easy-to-read format.

In a further preferred form of the present invention, the data processing device includes: an output style information storage part for storing output style information defining output styles; an output content synthesis part for preparing an output content for each of a plurality of pieces of equipment of interest based on each of a plurality of related equipment information sets, which are finally extracted by the monitored equipment extraction part with the plurality of pieces of equipment of interest being set as base points of extraction, respectively, output style information stored in the output style information storage part, and monitor data obtained from the data collection part; and an output information storage part for storing, as output information, the output content which has been prepared for each of the plurality of pieces of equipment of interest by the output content synthesis part. With such an arrangement, by using weight coefficient storage information and structured equipment information, it is possible to extract in advance only those pieces of equipment closely related to a certain piece of equipment which are defined in a certain piece of display style information, and then to present appropriate information based on the extraction result in a later time. As a result, it is possible to extract in advance pieces of equipment closely related to a certain piece of equipment from pieces of equipment defined in a certain piece of display style information to prepare the definition of an output content by using the extraction result as it is or by processing it in an appropriate manner. Thus, the amount of labor required for defining the output content beforehand can be reduced to a practical extent.

In a further preferred form of the present invention, the monitoring system further includes an output device for reproducing an audio signal, and the data processing device includes: an output content synthesis part for preparing an output content consisting of a character string alone based on a related equipment information set finally extracted by the monitored equipment extraction part and monitor data obtained by the monitor data collection part; and a voice synthesis part which receives, as an input, the output content consisting of a character string alone prepared by the output content synthesis part to convert it into an audio output signal. With such an arrangement, it becomes possible to output necessary and appropriate data in voice form through appropriate extraction at the time when voice or audio data is output, which takes much time.

According to another aspect of the present invention, there is provided a monitoring system including: an output unit which presents monitor data to an operator; a first data processing device; and a second data processing device which processes data collected, passes the data to the output device as an output content. The first data processing device includes: a structured equipment information storage part for storing structured equipment information which includes equipment information on a plurality of pieces of equipment and relational information describing relations among the, plurality of pieces of equipment; a monitored equipment extraction part which roughly extracts, from structured equipment information stored in the structured equipment information storage part, equipment information and relational information on those pieces of equipment which have a prescribed relation to a piece of equipment of interest having a designation of attributes with the equipment of interest having the designation of attributes being set as a base point for extraction, the monitored equipment extraction part being further operable to set a weight value for each of the roughly extracted pieces of equipment from equipment information and relational information on the roughly extracted pieces of equipment, and finally extract pieces of equipment information as a related equipment information set based on the weight values; and a static output information storage part for storing static output information which relates a plurality of related equipment information sets, which are finally extracted by the monitored equipment extraction part with a plurality of pieces of equipment of interest including a designation of attributes being set as base points of extraction, respectively, to the plurality of pieces of equipment of interest including a designation of the attributes set as base points of extraction, respectively. The second the data processing device includes: a second static output information storage part for storing the static output information prepared by the first data processing device; a data collection part for collecting monitor data; and an output content synthesis part for extracting a related equipment information set corresponding to a specific piece of equipment of interest including a designation of attributes from the static output information stored in the second static output information storage part, the output content synthesis part being operable to synthesize an output content from the extracted related equipment information set and the monitor data collected by the data collection part and to pass the thus synthesized output content to the output device. With this arrangement, by using weight coefficient storage information and structured equipment information, it is possible to extract in advance a set of pieces of equipment closely related to a piece of equipment of interest to define an output content based thereon, so that the content of an output can be prepared by using the previously defined output content as it is or by processing it in an appropriate manner. As a result, the processing of extracting a set of pieces of related equipment information during online becomes unnecessary. Therefore, the amount of labor required for defining the output content can be reduced, and an effective extraction can be carried out.

While the invention has been described in terms of various preferred embodiments, those skilled in the art will recognize that the invention can be practiced with changes and modifications within the spirit and scope of the appended claims.

What is claimed is:

1. A monitoring system comprising:
   an output device which presents monitor data to an operator; and
   a data processing device including a data collection part for collecting the monitor data, processing the data collected by said monitor data collection part, and passing the data thus processed to said output device as an output content, said data processing device comprising:
   a structured equipment information storage part for storing structured equipment information which includes equipment information on a plurality of pieces of equipment and relational information describing relations among the plurality of pieces of equipment; and
   a monitored equipment extraction part which extracts, from structured equipment information stored in said structured equipment information storage part, equipment information and relational information on those pieces of equipment which have a prescribed relation to a piece of equipment of interest, having a designation of attributes, the equipment of interest having the designation of attributes being set as a base point for extraction wherein said monitored equipment extraction part calculates a weight value for each of the pieces of equipment from equipment information and relational information extracted by using equipment of interest and relational information that connects said equipment of interest on a graphic structure in which equipment information is represented by a node and said relational information is represented by an arc, and finally extracts pieces of equipment information as a related equipment information set based on the weight values.

2. The monitoring system according to claim 1, wherein said data processing device includes a weight coefficient information storage part which stores weight coefficient information comprising weight coefficients defined according to kinds of relations among the pieces of equipment; and
   said data processing device specifies the kinds of relations for the pieces of equipment extracted based on said relational information, and regards, as weight values, the values which are obtained by adding weight coefficients, which are obtained from the kinds of relations and the weight coefficient information stored in said weight coefficient information storage part.

3. The monitoring system according to claim 2, wherein the weight coefficient information stored in said weight coefficient information storage part comprises viewpoint-specific weight coefficient information defined by the kinds of relations among the pieces of equipment extracted and viewpoints at the time of extraction of the pieces of equipment; and weight coefficients, which are obtained from the viewpoint-specific weight coefficient information by designating a viewpoint of a piece of equipment of interest with the equipment of interest, which includes a designation of attributes and a viewpoint at the time of extraction, set as a base point of extraction, are regarded as the weight coefficient obtained from the weight coefficient information.

4. The monitoring system according to claim 3, wherein said data processing device comprises:

a warning equipment conversion information storage part for storing warning equipment conversion information which is defined by relations among warning names, and pieces of equipment and their attributes corresponding to the warning names, together with viewpoints included in the attributes; and a warning input part for specifying a piece of equipment, its attribute and its viewpoint relating to a warning based on warning information, which input the pieces of equipment based on the information from said monitor data collection part, and the warning equipment conversion information stored in said warning equipment conversion information storage part, wherein said data processing device makes the equipment, its attribute and its viewpoint relating to the warning, which have been specified by said warning input part, a base point of extraction.

5. The monitoring system according to claim 1, wherein equipment information in the structured equipment information stored in said structured equipment information storage part includes important equipment information indicating whether each piece of equipment is important; and values, which are obtained by adding a weight coefficient, corresponding to the important equipment information and set for each of the pieces of equipment extracted, to the weight values, are regarded as the weight values obtained from the weight coefficient information.

6. The monitoring system according to claim 1, wherein said data processing device comprises:

a warning equipment conversion information storage part storing warning equipment conversion information which defines relations among warning information, and pieces of equipment and their attributes corresponding to the warning information; and a warning input part which specifies a piece of equipment and its attribute relating to a warning based on warning information, which is input from the pieces of equipment based on the information from said monitor data collection part, and the warning equipment conversion information stored in said warning equipment conversion information storage part, wherein said data processing device makes the equipment and its attribute relating to the warning, which have been specified by said warning input part, a base point of extraction.

7. The monitoring system according to claim 1, wherein said data processing device comprises:

an output style information storage part for storing output style information defining output styles; and an output content synthesis part for preparing an output content based on a related equipment information set extracted by said monitored equipment extraction part, output style information stored in said output style information storage part, and monitor data obtained from said data collection part.

8. The monitoring system according to claim 7, further comprising an output device for reproducing an audio signal, wherein said data processing device comprises:

an output content synthesis part for preparing an output content consisting of a character string based on a related equipment information set extracted by said monitored equipment extraction part and monitor data obtained by said monitor data collection part; and a voice synthesis part which receives, as an input, the output content consisting of a character string alone prepared by said output content synthesis part for converting the character string into an audio output signal.

9. The monitoring system according to claim 1, wherein said data processing device comprises:

an output style information storage part for storing output style information defining output styles;

an output content synthesis part for preparing an output content for each of a plurality of pieces of equipment of interest based on each of a plurality of related equipment information sets, which are extracted by said monitored equipment extraction part with the plurality of pieces of equipment of interest being set as base points of extraction, respectively, output style information stored in said output style information storage part, and monitor data obtained from said data collection part; and an output information storage part for storing, as output information, the output content which has been prepared for each of the plurality of pieces of equipment of interest by said output content synthesis part.

10. The monitoring system according to claim 9, further comprising an output device for reproducing an audio signal, wherein said data processing device comprises:

an output content synthesis part for preparing an output content consisting of a character string based on a related equipment information set extracted by said monitored equipment extraction part and monitor data obtained by said monitor data collection part; and a voice synthesis part which receives, as an input, the output content consisting of a character string alone prepared by said output content synthesis part for converting the character string into an audio output signal.

11. A monitoring system comprising:

an output unit which presents monitor data to an operator;

a first data processing device; and a second data processing device which processes data collected, and passes the data to said output unit as an output content, said first data processing device comprising:

a structured equipment information storage part for storing structured equipment information which includes equipment information on a plurality of pieces of equipment and relational information describing relations among the plurality of pieces of equipment;

a monitored equipment extraction part which extracts, from structured equipment information stored in said structured equipment information storage part, equipment information and relational information on those pieces of equipment which have a prescribed relation to a piece of equipment of interest, having a designation of attributes with the equipment of interest having the designation of attributes, set as a base point for extraction, said monitored equipment extraction part setting a weight value for each of the pieces of equipment from equipment information and relational information extracted, and extracting pieces of equipment information as a related equipment information set based on the weight values; and a static output information storage part for storing static output information which relates a plurality of related equipment information sets, which are finally extracted by said monitored equipment extraction part with a plurality of pieces of equipment of interest, including a designation of attributes being set as base points of extraction, respectively, to the plurality of pieces of equipment of interest including a designation of the attributes set as base points of extraction, respectively;

said second data processing device comprising:
 a second static output information storage part for storing the static output information prepared by said first data processing device;
 a data collection part for collecting monitor data; and
 an output content synthesis part for extracting a related equipment information set corresponding to a specific piece of equipment of interest including a designation of attributes from the static output information stored in said second static output information storage part, said output content synthesis part being operable to synthesize an output content from the related equipment information set extracted and the monitor data collected by said data collection part and to pass the output content synthesized to said output unit.

* * * * *